(12) United States Patent
Salhin

(10) Patent No.: US 11,372,896 B2
(45) Date of Patent: Jun. 28, 2022

(54) METHOD AND APPARATUS FOR GROUPING DATA RECORDS

(71) Applicant: Sage (UK) Limited, Newcastle upon Tyne (GB)

(72) Inventor: Ahmed Fouad Saleh Salhin, Newcastle upon Tyne (GB)

(73) Assignee: Sage (UK) Limited, Newcastle upon Tyne (GB)

( * ) Notice: Subject to any disclaimer, the term of this patent is extended or adjusted under 35 U.S.C. 154(b) by 181 days.

(21) Appl. No.: 16/752,341

(22) Filed: Jan. 24, 2020

(65) Prior Publication Data

US 2020/0242134 A1 Jul. 30, 2020

(30) Foreign Application Priority Data

Jan. 25, 2019 (EP) .................................... 19153803

(51) Int. Cl.
*G06F 17/00* (2019.01)
*G06F 16/28* (2019.01)
*G06N 20/00* (2019.01)

(52) U.S. Cl.
CPC ........... *G06F 16/285* (2019.01); *G06N 20/00* (2019.01)

(58) Field of Classification Search
CPC ...... G06F 16/285; G06F 16/906; G06F 16/35; G06N 20/00; G06Q 40/12
See application file for complete search history.

(56) References Cited

U.S. PATENT DOCUMENTS

| 10,621,493 B2* | 4/2020 | Oberhofer ............. G06F 16/215 |
| 10,726,501 B1* | 7/2020 | Ran ........................ G06Q 40/12 |
| 2011/0179017 A1 | 7/2011 | Meyers et al. |
| 2018/0102938 A1* | 4/2018 | Yoon ....................... G06F 17/40 |
| 2018/0113928 A1 | 4/2018 | Oberhofer et al. |
| 2018/0181895 A1 | 6/2018 | Singh et al. |

(Continued)

OTHER PUBLICATIONS

Qiang Cao, Xiaowei Yang, Jieqi Yu, and Christopher Palow. Uncovering Large Groups of Active Malicious Accounts in Online Social Networks. In Proceedings of the 2014 ACM SIGSAC Conference on Computer and Communications Security, Association for Computing Machinery, NY, pp. 477-488, November (Year: 2014).*

(Continued)

*Primary Examiner* — Greta L Robinson
(74) *Attorney, Agent, or Firm* — Wolf, Greenfield & Sacks, P.C.

(57) ABSTRACT

A system and computer-implemented method of grouping data records for subsequent data record searching. A level of textual similarity of data records in a group of data records is determined using matching and identifying a textual similarity metric between pairs of data records in the group of data records, and clustering the data records to form groups of textually similar data records. The groups of textually similar data records are provided to a computerised log of textually-matched data records. Further, temporally-repeating data records in the computerised log are identified. If all the data records in a group of temporally-repeating textually similar data records have a level of temporal and textual similarity above an overall similarity threshold, they are provided to a computerised log of temporally and textually-matched data records, for example for searching or future forecasting.

16 Claims, 11 Drawing Sheets

(56) References Cited

U.S. PATENT DOCUMENTS

2019/0018855 A1\* 1/2019 Harding, Jr. ...... G06F 16/24532
2019/0130017 A1\* 5/2019 B. ........................ G06F 16/245

OTHER PUBLICATIONS

Extended European Search Report for European Application No. 19153803.2 dated Apr. 4, 2019.
European Communication for European Application No. 19153803.2 dated Jun. 4, 2021.

\* cited by examiner

METHOD AND APPARATUS FOR GROUPING DATA RECORDS

REFERENCE TO RELATED APPLICATIONS

This application claims priority under 35 U.S.C. § 119 to European Patent Application No. 19153803.2, filed on Jan. 25, 2019, the entire disclosure of which is incorporated herein by reference.

BACKGROUND

Processing data to identify trends from historical data records, and predict likely future data records, can be challenging. Variations in data descriptors may exclude two data records from being associated with one another in an automated computerised system, when in reality the two records are related and could be grouped together. The grouping together of associated data records may allow for improvements in computer memory management and improve the speed of data retrieval.

It is an object of embodiments of the invention to at least mitigate one or more of the problems of the prior art.

STATEMENTS OF INVENTION

According to aspects of the present invention, there are provided systems, methods, and computer program code as set forth in the appended claims.

In an aspect there is provided a system for grouping data records for subsequent data record searching, the system comprising:
  a computer-implemented data record textual match analysis module arranged to:
    determine a level of textual similarity of data records in a group of data records; and
    if the data records in the group of data records have a level of textual similarity above a textual similarity threshold, provide the data records to a computerised log of textually-matched data records; and
    if the data records in the group of data records have a level of textual similarity below the textual similarity threshold, provide the data records to a computer-implemented data record grouping module for further similarity analysis;
  a computer-implemented data record grouping module arranged to perform the further similarity analysis by being arranged to:
    identify a textual similarity metric between pairs of data records in the group of data records;
    record the textual similarity metric of the group of data records;
    cluster the data records of the group of data records using the recorded textual similarity metric to form one or more clusters of textually similar data records; and
    provide the one or more clusters of textually similar data records to the computerised log of textually-matched data records;
  a computer-implemented repeating data record identifier module arranged to identify temporally-repeating data records of the textually-matched data records recorded in the computerised log of textually-matched data records; and
  a computer implemented quality control data record grouping module arranged to:
    analyse the temporally-repeating textually-matched data records in the group for textual and temporal similarity, and
    if all the data records in the group of temporally-repeating textually similar data records have a level of temporal and textual similarity above an overall similarity threshold, provide the temporally-repeating textually similar data records to a computerised log of temporally and textually-matched data records.

The computer implemented quality control data record grouping module may be further arranged to: provide non-temporally repeating textually similar data records to a computerised log of non-temporally matched, textually-matched data records. For example, such records may be used with the temporally and textually-matched data records for forecasting and anomaly detection.

The system may comprise a computer-implemented forecasting module configured to predict a future data record based on the temporally-repeating textually similar data records. The future data record may comprise a textual portion matching the textual portions of the temporally and textually-matched data records; and a timestamp corresponding to a time predicted based on the timestamps of the temporally and textually-matched data records.

The data record grouping module may comprise a computer-implemented data record pair matching module arranged to:
  identify pairs of data records from the group of data records;
  identify a textual similarity metric of the data records of each pair of data records;
  record the identified textual similarity metrics of each pair of data records in a lookup table; and
  record a similarity matrix from identified textual similarity metrics of each pair of data records recorded in the lookup table, the similarity matrix comprising the pairs of data records with their corresponding textual similarity metrics; and
  provide the similarity matrix for the clustering of the data records using the similarity matrix.

The data record pair matching module may be arranged to identify the textual similarity metric of the data records of each pair of data records by applying one or more similarity metric methods to each pair of data records to obtain a textual similarity metric for each pair. The one or more similarity metric methods may comprise one or more of:
  an edit distance for each pair of data records;
  a cosine distance based on a word count of the data records; or
  a cosine distance based on a word2vec analysis of the data records.

The edit distance may be the Damereau-Levenshtein distance in some examples.

The data record pair matching module may be further arranged to:
  identify the textual similarity metric of the data records of each pair of data records by, following obtaining the textual similarity metric for each pair, reconciling the textual similarity metrics for the pairs of data records in the group of data records using convex optimisation; and
  wherein the similarity matrix comprises the reconciled textual similarity metric of the data records of each pair of data records.

The data record grouping module may comprise a computer-implemented data record clustering module arranged to:
cluster the textual portions of the data records to identify a clustered textual descriptor for the textually matched data records in the group; and
provide the textually matched data records in the group, with their corresponding clustered textual descriptor, to the computerised log of textually-matched data records.

The repeating data record identifier module may be arranged to identify temporally-repeating data records of the textually matched data records by:
analysing the timestamp portions of the textually matched data records to determine a time separation between pairs of the textually matched data records which are temporally consecutive;
determining if the textually matched data records comprise timestamp portions separated by regular time intervals;
if the textually matched data records comprise timestamp portions separated by regular time intervals, categorising the textually matched data records as recurrent temporally-repeating textually matched data records; and
if the textually matched data records do not comprise timestamp portions separated by regular time intervals, categorising the textually matched data records as non-recurrent temporally-repeating textually matched data records.

The system may comprise a data record grouping module arranged to assign a group descriptor to the group of temporally-repeating textually matched data records.

Each of the original data records may further comprise an amount portion. The system may further comprise a data record amount identifier module arranged to identify an amount value of each data record in the group of textually matched data records from the amount portions of the data records.

The system may comprise a data record amount similarity module arranged to:
determine a degree of similarity of the identified amount values of the textually matched data records in the group; and
assign an amount metric to the group based on the determined degree of similarity.

The quality control data record grouping module may be further arranged to analyse the temporally-repeating textually matched data records in the group for amount value similarity, and if all the data records in the group of temporally-repeating textually matched data records have a level of temporal, textual and amount value similarity above an overall similarity threshold, provide the temporally-repeating textually matched amount value similar data records to a computerised log of temporally, textually, and amount-matched data records.

The quality control data record grouping module may be arranged to:
compare one or more of the textual portions and temporal portions of the data records in the group with further textual portions and further temporal portions of further data records in a further group; and
if the textual portions and temporal portions of the data records in the group are determined to match the further textual portions and further temporal portions of the further data records above an inter-group matching threshold, link the group and further group together as associated groups.

The system may comprise a data cleansing module arranged to reformat the original data records prior to processing by the data record textual match analysis module to provide the original data records having a common format.

The system may comprise a new data record handling module configured to:
assign a textual group descriptor and a temporal group descriptor to data records in a group, the textual group descriptor based on the textual similarity of data records in the group and the temporal group descriptor based on the temporal repetition of the data records in the group;
determining a textual fitting parameter based on the textual group descriptor and determining a temporal fitting parameter based on the temporal group descriptor, for the data records in the group;
determining if a textual portion of a new data record corresponds to the textual fitting parameter; and determining if a timestamp portion of the new data record corresponds to the temporal fitting parameter; and
if the textual portion corresponds to the textual fitting parameter and if the timestamp portion corresponds to the temporal fitting parameter, assigning the new data record to the group.

The data cleansing module may be arranged to reformat the original data records by one or more of:
replacing specific words with corresponding generic words in the textual portion of the data records;
removing stop words from the textual portion of the original data records, the stop words not required to determine textual similarity between data records; and
removing specific characters from the textual portion of the original data records, the characters not required to determine textual similarity between data records.

In an aspect, there is provided a computer-implemented method of grouping data records for subsequent data record searching, the method comprising:
determining a level of textual similarity of data records in a group of data records;
if the data records in the group of data records have a level of textual similarity above a textual similarity threshold, providing the data records to a computerised log of textually-matched data records; and
if the data records in the group of data records have a level of textual similarity below the textual similarity threshold, providing the data records for further similarity analysis, the further similarity analysis comprising:
identifying a textual similarity metric between pairs of data records in the group of data records;
recording the textual similarity metric of the group of data records;
clustering the data records of the group of data records using the recorded textual similarity metric to form one or more groups of textually similar data records; and
providing the one or more groups of textually similar data records to the computerised log of textually-matched data records;
identifying temporally-repeating data records of the textually-matched data records recorded in the computerised log of textually-matched data records; and
analysing the temporally-repeating textually-matched data records in the group for textual and temporal similarity, and if all the data records in the group of temporally-repeating textually similar data records have a level of temporal and textual similarity above an overall similarity threshold, providing the temporally-repeating textually similar data records to a computerised log of temporally and textually-matched data records.

In an aspect, there is provided computer program code which, when executed by a computer, is arranged to perform any method claimed herein. The computer program code may be stored on a non-transitory computer-readable medium. The computer program code may be a sub-program configured to operate with one or more further computer programs, such as an accounting program, stock control program, or computer traffic monitoring program.

In an aspect, there is provided computer program code which, when executed by a computer, is arranged to:
provide one or more accounting functions to operate on one or more data records;
perform any method described herein; and
provide one or more accounting functions to operate on one or more temporally-repeating textually similar data records.

In an aspect there is provided a computer comprising any system described herein, or arranged to perform any method described herein.

In an aspect, there is provided a computer, comprising one or more processing devices arranged to, in use, execute computer readable instructions to implement a data record grouping application, wherein the data record grouping application is arranged to perform any method described herein.

In an aspect there is provided a data processing system or computer program product for use in any system described herein.

In an aspect there is provided a computer system comprising:
a server computer comprising any system described herein; and
a client computer communicably coupled to the server computer by a computer network, the client computer configured to execute client computer software to communicate the group of data records to the server computer and receive the temporally and textually-matched data records from the server computer. The group of data records may be communicated to the server computer in response to a user input received by the client computer.

In an aspect there is provided a client computer or client computer software for use in the abovementioned computer system. The client computer or client computer software may be configured to display the received temporally and textually-matched data records, e.g. on a display screen for a user. The client computer or client computer software may be configured to provide the received temporally and textually-matched data records for further processing, for example by a cash flow prediction computer program.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1:
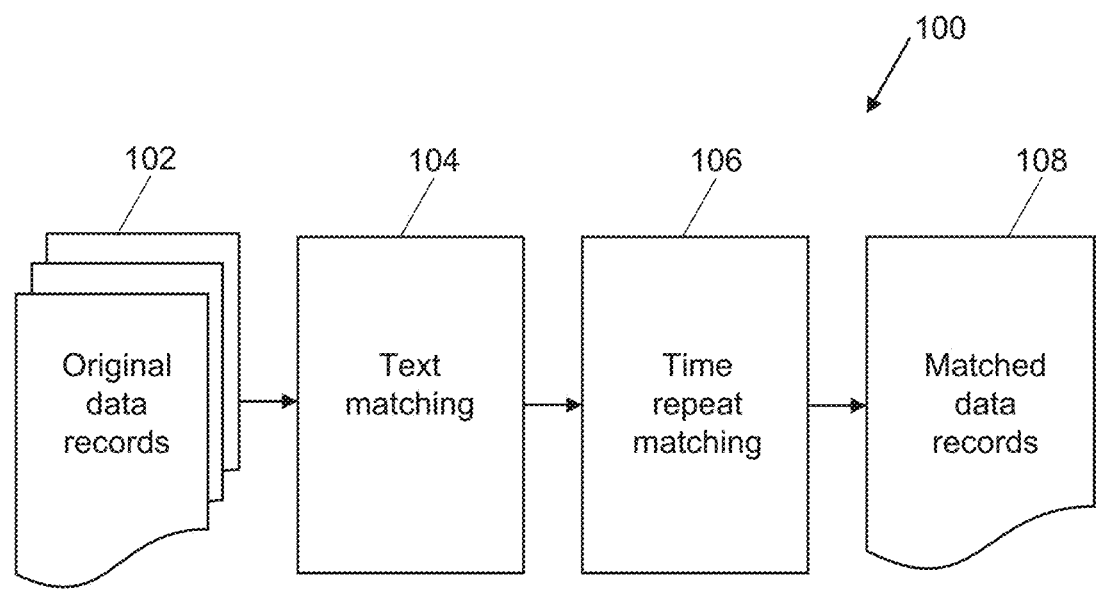
FIG. 1 shows a system according to an embodiment of the invention.

Some examples described herein may apply to determining, and in some cases predicting, a business's cash flow. Cash is indispensable to businesses of all sizes. Businesses often focus on profit, but not putting enough focus on cash flow may introduce a huge risk, especially for smaller companies. Cash flow forecasting and management is important in order to keep businesses solvent, and to avoid bankruptcy. Cashflow is a crucial element for any business to survive, even if it runs as a non-profit organization.

Business transactions may be categorized as either Operating, Investing or Financing activities. Data shows that Operating activities form approximately 85% of the number of transactions for most businesses. A system capable of forecasting the cashflow of such a substantial part of a business's transactions may allow for improved cash flow and cash balance management. Having an accurate cash flow forecast in place can help a business foresee potential problems which may arise in the period ahead, and it can help businesses to quickly make decisions to avoid those problems. Cash flow management describes the process of analysing cash flow forecast data, and based on that data making the best decisions to evade cash flow crises. The cause of the problem may be identified and actions may be taken to ensure that enough cash is paid in to cover company expenditure. Cash flow forecasting enables a business owner to understand what needs to be done to avoid a negative or low cash flow balance, and when. Potential future shortfalls in cash balances may be identified and flagged early. An accurate cash flow forecast can accurately predict the magnitude and timing of a cash flow balance problem.

Cash flow forecasting typically involves the business owner having to manually provide data, i.e. all the outgoing payments that are planned over a period (supplies, salaries, rent, utilities etc.), and all the incoming sums expected to enter the business over the same period (sales, licensing fees etc). Outgoings are subtracted from incomings to give the cash balance at any time point. The accuracy of the forecast is therefore dependent upon the knowledge of the business owner as to their ingoings and outgoings, and their accuracy in representing those. In order for the forecast to remain accurate, it must be updated over time. In practise, cash flow may be complicated by many variables of varying complexity to predict, and the input to cash flow forecasting may require constant manual updating to remain accurate.

If a cash flow forecast is not accurate, then a false positive result may arise indicating a cash flow problem which does not really exist, which wastes time and resources as employees spend time and effort trying to avoid a cash flow crisis that would never occur. Another potential problem with inaccurate cash flow forecasting is that a real cash flow crisis could be missed in an inaccurate model, and the opportunity to avoid it is lost.

In the example of cash flow forecasting, examples disclosed herein may allow for the partial or complete automation of cash flow forecasting, such that the accuracy of the model is not dependent upon the business owner, nor the business owner's knowledge of ingoings or outgoings. Furthermore, the forecast results may be automatically interpreted to facilitate cash flow management. The business owner may be presented with information they need to inform their decision making, without requiring the business owner to manually interpret the output of the cash flow forecast. For example, suggestions may be made as to how cash flow crises could be avoided, such as suggesting chasing payments of a certain size, or a from a certain customer, or by delaying an ongoing payment.

There are multiple challenges that need to be overcome to, for example, improve the automation of cash flow forecasting. Examples disclosed herein may provide solutions for the identification of recurrent and repeated transactions from accounting or bank account data. Examples disclosed herein may support a reporting engine that relates to the historical transactions, for example inside an accounting system.

Accounting transactions may be entered to an accounting system in various formats. Such entries to the accounting system may include information on the date they occurred, the date they entered the system, amount, vendor/customer and detailed or un-detailed transaction description. The data may be logged manually in the system and some information, like description and vendor, can vary between similar transactions dependent on the preference of the user. It can be particularly challenging to identify a pair or group of recurring or repeated transactions when there is a change in the textual entries of transactions (e.g. Phone Bill and Telephone Charges), or a price change between two consecutive payments, e.g. due to a subscription status (e.g. upgrade or downgrade), variable charge (e.g. mobile phone bill), or a change in supplier (e.g. utility provider switch). For example, a user might log the following transaction to the system [Amount: 100, Description: Mobile phone bill, Vendor: Vodafone, Date: 01/02/2018], while the same or another user enters the following transaction in the subsequent month [Amount: 104, Description: cell phone costs, Vendor: Vodafone Ltd, Date: 03/03/2018]. The two transactions are related recurrent payments but may not be automatically identified as such due to variations in the vendor name, description, the date (not being the same day of subsequent months) and amount.

A challenge lies in detecting that both transactions belong to the same group (mobile phone bill), since the textual descriptors "description" and "vendor", do not match although they refer to the same description and vendor in both records. Another challenge is detecting the recurring pattern in the transaction, i.e. whether the transaction is daily, weekly, monthly, etc. The source of this challenge arises because date differences between a sequence of transactions are not necessarily at fixed intervals. In the example above, the transactions are monthly but they do not consistently occur on the first day of the month. This may be due to various reasons, for example, the bill was due on a weekend and has been postponed to the following weekday, or it occurs every 30 days not every exact month. A further challenge is to determine whether the recurring/repeated transactions have an exact amount, a similar amount (i.e. within 5%), or an amount that changes due to upgrades or different amount. This is particularly important for cashflow forecasting as it can be used to predict the amount of a future transaction that hasn't occurred yet. A solution to such challenges should satisfy the limitations of scalability and speed within a computer system. A solution should also work in real time, or near real time, and be capable of analysing thousands of transactions/data records in few seconds. Examples disclosed herein may provide such improvements.

Identifying recurring and repeated transactions may enable a cashflow management solution to present customers with what transactions contributed to the cashflow forecasts. That may, in turn allow for alerts to be given for short and long-term deficiencies in cash balances and provide advice on how to mitigate such deficiencies.

Another challenge relates to the extraction of cash flow data from an accounting system. A particular challenge is the identification of data which represents recurring and/or repeated patterns in accounting or bank account transactions. A recurring transaction may be defined as an incoming or outgoing transaction that occurs at a regular time period, such as monthly, annually etc. A repeated transaction may be defined as an incoming or outgoing transaction that occurs more than once during a given period of time. Recurring and repeated transactions can vary in amount, or can be for the same or similar amounts. Accurate identification of recurring and repeated transactions is essential to ensure cashflow predictions are accurate (predictive), and it is necessary therefore for automated systems to be capable of recognising these transactions, extracting the related data, and including it in the model.

Other examples of information which may be obtained from data records which are grouped according to their textual similarity and recurrent or repeating nature include:
  Support queries, such as how much money was spent on office supplies in the last three months;
  Improving the accuracy of cashflow forecasting;
  Grouping of transactions and presenting patterns (Intelligent Reporting);
  Reducing the number of transactions for processing, for example, displaying the most probable transactions to occur in a particular day;
  Categorise bank feeds and classifying bank transactions Acting as a back engine for alerts, such as alerting customers if a recurrent transaction is due.

Of course, it will be appreciated that the above example is non-limiting, and the ability to group and search data records, and make predictions about future data records in a similar way applies to many different data record systems. The term "transaction" as used above in relation to a cash flow example may be replaced by the term "data record" in other non-cash related examples.

Another example is of a warehouse stock system (such stock may have an associated expiry date and description). Managing the stock records (data records) using examples described herein may allow for improved stock management and less stock wastage due to stock expiry, by being able to predict trends in stock movement and demand, for example. The computerised stock system may have lower memory requirements, and may allow for faster data retrieval, if the data records are consolidated according to common textual descriptors and temporal recurrence as provided by examples disclosed herein.

Another example is of computerised records of traffic to and from a computer in a computer network. Computer traffic data items may have a textual descriptor (e.g. a web domain or IP address), a timestamp (e.g. time of receipt or of transmission) and an amount (e.g. file size in MB). Consolidating associated traffic data items by, for example, identifying common textual descriptors and recurrent behaviour of different traffic records, may allow for improved computer traffic management by identifying trends and allowing for predictions of future computer traffic transmission/reception requirements, using examples as described herein.

In summary, grouping similar data records, identifying records representing data items which repeat in time, and predicting likely future data records from historical data can be challenging when variations in the data record fields arise for similar records. The ability to group similar records and identify (and predict) recurrent data may allow for a reduced processing burden when searching data records by consolidating or linking related data records, compared to a computer system searching non-consolidated data records. The data records may also, following consolidation/grouping, allow for a reduced memory storage burden as fewer data records may be stored to represent all the original data records. Retrieving stored data may also be performed faster as fewer data records can be searched which still represent the full original data set.

Overall, embodiments described herein may address the above-mentioned technical problems, e.g. may provide more accurate and more reliable association of similar data records, which may in turn reduce usage of computer resources handling multiple data records (similar records with variable text descriptors, and/or data records repeating in time) which may otherwise be represented by a single consolidated data record.

FIG. 1 shows a system 100 according to an embodiment of the invention. A plurality of original data records 102 are passed to a text matching computer module 104, which is arranged to analyse textual descriptor portions of each data record and associate data records having textual descriptors which match (i.e. which are similar above a threshold similarity). This stage may be considered to identify groups of similar data records with respect to the textual content. The text matching computer module 104 may be considered to be arranged to receive a plurality of original data records 102 as input; each original data record 102 comprising a textual portion and a timestamp portion; and determine a group of textually similar data records from the plurality of original data records 102.

The text matched data records are then passed to a time repeat matching computer module 106, which is arranged to analyse timestamp portions of each text matched data record and associate text matched data records having time stamps which indicate that the data record is a recurrent one (either irregular or regular/periodic). This stage may be considered to classify each group of text matched data records as containing recurrent (data records occurring in a regular time pattern) or repeated transactions (data records occurring in an irregular time pattern).

Further steps may be performed by the time repeat computer module 106, including identifying time frequencies of recurrent transactions (i.e. weekly, monthly, etc.). In some examples (see FIG. 10) a further amount matching computer module may be arranged to identify an amount similarity for both recurrent and repeated transactions (e.g. whether amount is exactly the same, similar (±5%), different). In some examples (see FIG. 4) a further forecasting computer module may be arranged to forecast an upcoming data record from the identified previous recurrent/repeated data records. In some examples, the quality of the identified recurrent/repeated data records may be determined, for example as a confidence level check of a future data record prediction.

Figure 14:
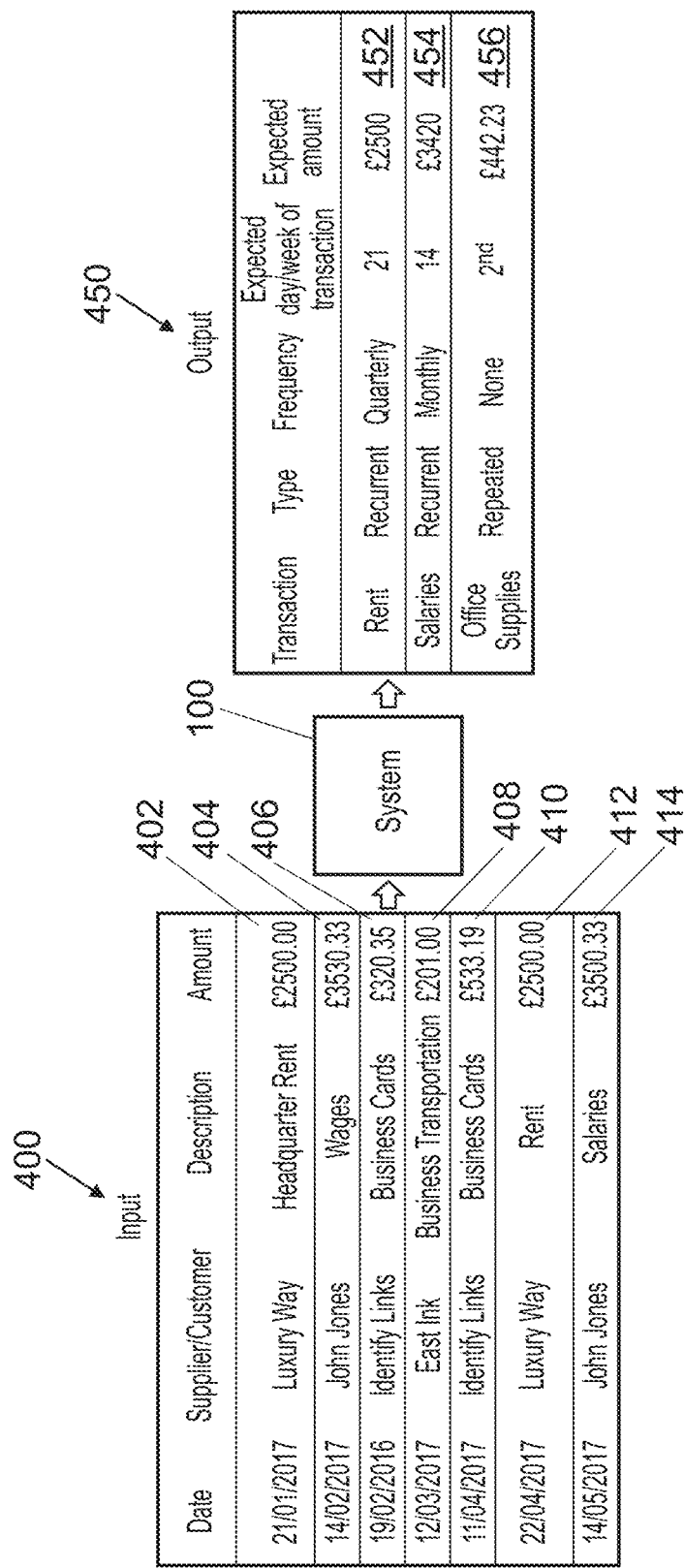
FIG. 14 shows an example of grouped data records according to an embodiment of the invention.

The text matched, recurrent data records are grouped and provided as matched data records 108. A worked example is shown in FIG. 14. The matched data records 108 may be stored, and may allow for easier searching and predictions to be performed by a computer. The matched data records may require less computer storage capacity than the original data records because similar and recurrent data records have been identified and consolidated. Thus, a processor of the computer may search the memory to retrieve or otherwise access data records meeting one or more search criteria in a more reliable i.e. accurate, and faster manner, because the data records have been consolidated by textual descriptor, and by any time recurrence in the data records, thereby providing a technical improvement to the storage and subsequent retrieval of data records.

Figure 2:
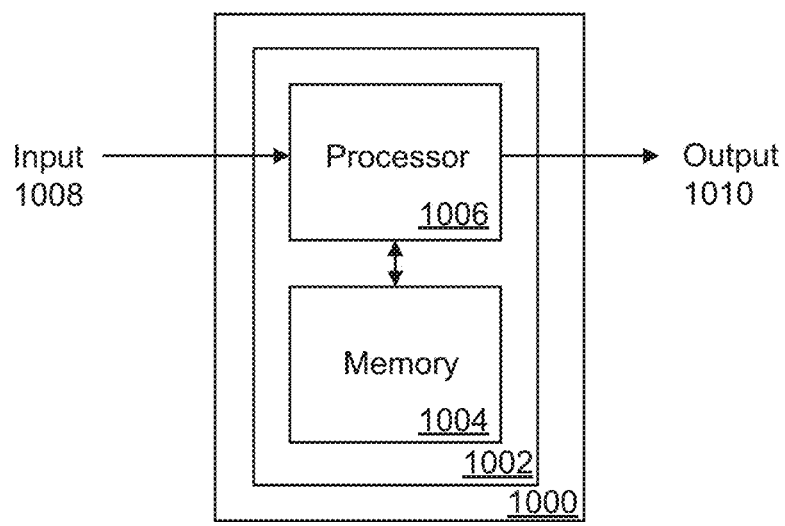
FIG. 2 shows a computer according to an embodiment of the invention.

FIG. 2 shows a computer 1000 according to an embodiment of the invention. The computer 1000 may be the system 100, or may form a part of the system 100 (i.e. the system 100 of FIG. 1 may comprise more than one computer 1000). The computer 1000 may comprise one or more processing units 1002 (one is shown in FIG. 2). Each processing unit comprises a memory 1004 and processor 1006. The computer 1000 may comprise one or more processors 1006 arranged to operably execute computer software/computer program code thereon, where the computer software/computer program code is stored in a computer-readable medium accessible to the one or more processors 1006. The computer-readable medium may be one or more memory devices, where the memory may also store data for use by the software/program code (e.g. memory 1004 or a separate memory store external to the computer 1000).

The computer 1000 can receive data (e.g. original data records) as input 1008 and can provide data (e.g. matched data records) as output 1010. It will be appreciated that the memory 1004 in which data records/matched data records may be stored may be part of a physically distinct computer system than the one or more computers implementing the processing modules, such as the text matching module 104 and time repeat module 106 of FIG. 1.

The system 100 may reside on the computer 1000 in some examples. In particular, the system 100 may be implemented as a plurality of modules which operatively execute one or more processors 1006 of the computer 1000. It will be appreciated that the one or more processors 1006 do not necessarily need to be formed as part of the same physical server computer 1000 and that the processors 1006 may form a virtual machine implementing the system 100 i.e. as a cloud computer. Embodiments may be implemented by a plurality of distributed computers 1000, with each of the computers 1000 performing one or more of processing steps. For example, a client computer may provide the group of data records (e.g. original data records) to a server computer, wherein the server computer processes data records from the group of data records and provides, to the client computer, temporally and textually-matched data records. The server computer may be remote from the client computer. In some examples the server computer may be a remote distributed network, or computing cloud. In some examples the client computer may be, for example, a desktop computer, a laptop computer, a tablet computer, a smartphone, another portable electronic device, or a module for one or more of the same.

Figure 3:
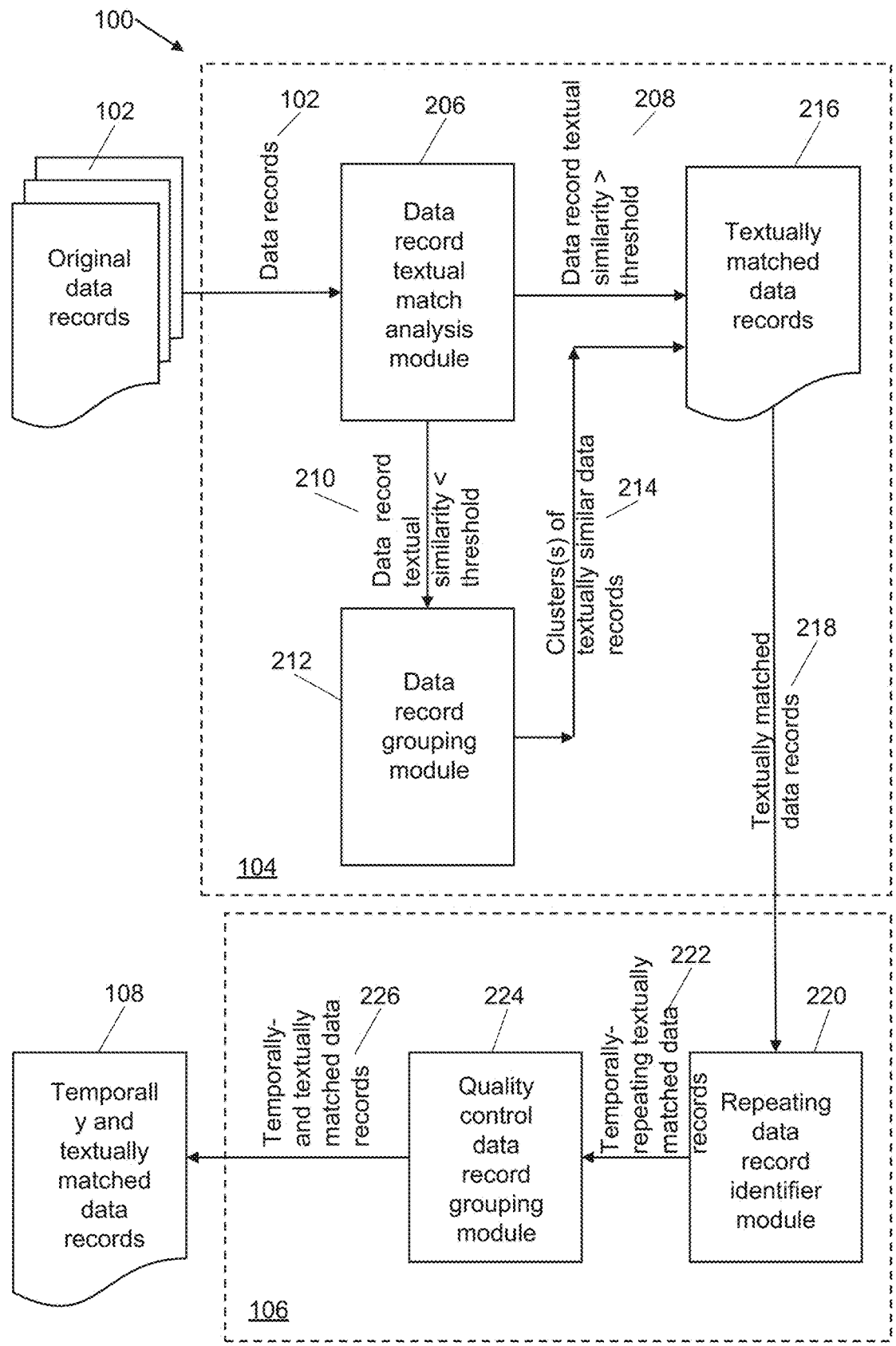
FIG. 3 shows a system according to an embodiment of the invention.

FIG. 3 illustrates a system 100 according to an embodiment of the invention. The system 100 is for grouping data records 102 for subsequent data record searching. The system 100 comprises the text matching module 104 and time repeat module 106 as in FIG. 1. In this example, the text matching module 104 comprises a data record textual match analysis module 206, which can pass data 208 to a textually matched data record log 216, or can pass data 210 to a data record grouping module 212 for further processing before data 214 is passed to the textually matched data record log 216. From the textually matched data record log 216, data 218 is output from the text matching module 104 and input to the time repeat module 106 where it is processed by the repeating data record identifier module 220, which passes data to the quality control data record grouping module 224 before providing the temporally and textually matched data records 226 as output 108.

The data record textual match analysis module 206 is configured to take in the original data 102 as input and determine which of the records are textually matching. Detecting patterns using textual descriptors, such as vendor names and transaction descriptions in financial records, may be considered to determine the natural similarity in the textual field(s) of data records to consider grouping those records together. This process may reduce the scope of a similarity search between descriptions that are written in different formats, but belong to the same group. For example, the transaction [Amount: 100, Description: Office Supplies, Vendor: Ryman, Date: 01/02/2018] may be easily matched to this transaction [Amount: 313.23, Description: Office Supplies, Vendor: Ryman, Date: 09/04/2018], because the description and vendor match exactly.

A benefit of this "exact textual matching" step is to reduce the number of data records that need to be processed in subsequent steps, such as by the data record grouping module 212, and also to reduce the time needed to run the algorithm over the system 100. Of course, an "exact" textual match between data records by the data record textual match analysis module 206 may require the similarity in textual descriptor between two data records to be above a predetermined similarity threshold, such that the descriptors "Banana" and "bananas" may be considered to be an exact match despite the differences in capitalisation and pluralisation between the two descriptors. The output of this module 206 is provided as data records having a textual similarity above a threshold 208 to the textually matched data record log 216. The data records held in the textually matched data record log 216 may be labelled as "possible recurrent" data records, as the next step in their processing considers whether they are recurrent or repeating transactions.

The system 100 thus comprises a computer-implemented data record textual match analysis module 206 arranged to: determine a level of textual similarity of data records 102 in a group of data records; and if the data records 102 in the group of data records have a level of textual similarity above a textual similarity threshold, provide the data records 208 to a computerised log of textually-matched data records 216; and if the data records 102 in the group of data records have a level of textual similarity below the textual similarity threshold, provide the data records 210 to a computer-implemented data record grouping module 212 for further similarity analysis.

The data record grouping module 212 is configured to take in the original data 210 which was not considered to have an exact textual match as input (the exact textual matching data has been passed to the textually matched data record log 216), and determine which of the records are related by having a textual match which was not detected as an exact match. For example, "office supplies", "stationary" and "office stationary" may not have been determined to be an exact match, but the data record grouping module 212 may process the data and determine these three data records to be related, and cluster them together. A textual similarity metric is determined for the clusters of matched data records and may be recorded e.g. in a lookup table for future processing. The operation of this module 212 is described in more detail in relation to FIG. 5 and FIG. 6. This module 212 outputs clusters of textually similar data records 214 to the textually matched data record log 216 to be stored with the data records having a textual similarity above a threshold 208.

Thus, the computer-implemented data record grouping module 212 is arranged to perform further similarity analysis by being arranged to: identify a textual similarity metric between pairs of data records in the group of data records 210; record the textual similarity metric of the group of data records; cluster the data records 210 of the group of data records using the recorded textual similarity metric to form one or more clusters of textually similar data records 214; and provide the one or more clusters of textually similar data records 214 to the computerised log of textually-matched data records 216.

The repeating data record identifier module 220 takes textually matched data records 218 from the textually matched data record log 216 as input, and processes the timestamp data of each data record to identify recurrent (periodically repeating) or repeating (irregularly repeating) data records. Thus the computer-implemented repeating data record identifier module 220 is arranged to identify temporally-repeating data records of the textually-matched data records 218 recorded in the computerised log of textually-matched data records 216. This module is described in more detail in relation to FIG. 7.

Identified temporally repeating textually matched data records 222 are provided as input to a quality control data record grouping module 224 which checks the temporally repeating textually matched data records 222 and groups them according to overall matching data records, before providing the temporally and textually matched data records 226 as output 108. The computer implemented quality control data record grouping module 224 is arranged to:

analyse the temporally-repeating textually-matched data records 222 in the group for textual and temporal similarity, and if all the data records in the group of temporally-repeating textually similar data records 222 have a level of temporal and textual similarity above an overall similarity threshold, provide the temporally-repeating textually similar data records 226 to a computerised log of temporally and textually-matched data records 108.

Forecasting

Figure 4:
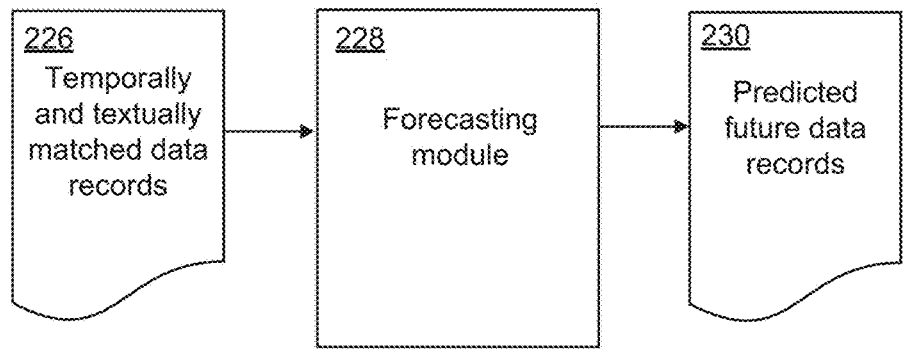
FIG. 4 shows a portion of a system comprising a forecasting module according to an embodiment of the invention.

FIG. 4 shows a portion of a system comprising a forecasting module 228 according to an embodiment of the invention. Temporally-repeating textually similar data records 226, such as those produced by the system of FIG. 3 may be provided as input to a forecasting module 228 which processes the historical data and, based on the temporally repeating nature of particular data records, predicts a likely future data record, and outputs this as a predicted future data record 230. In other words, the system 100 may comprise a computer-implemented forecasting module 228 configured to predict a future data record 230 based on the temporally-repeating textually similar data records 226. The future data record 230 comprises a textual portion matching the textual portions of the temporally and textually-matched data records 226; and a timestamp corresponding to a time predicted based on the timestamps of the temporally and textually-matched data records 226. As a simple example, if data records [bread, 01/01/2019], [bread, 01/02/2019] and [loaves, 01/03/2019] are provided as a group of temporally-repeating textually similar data records 226, the forecasting module 228 may predict a future data record 230 of [bread, 01/04/2019].

Identifying Similarities

Figure 5:
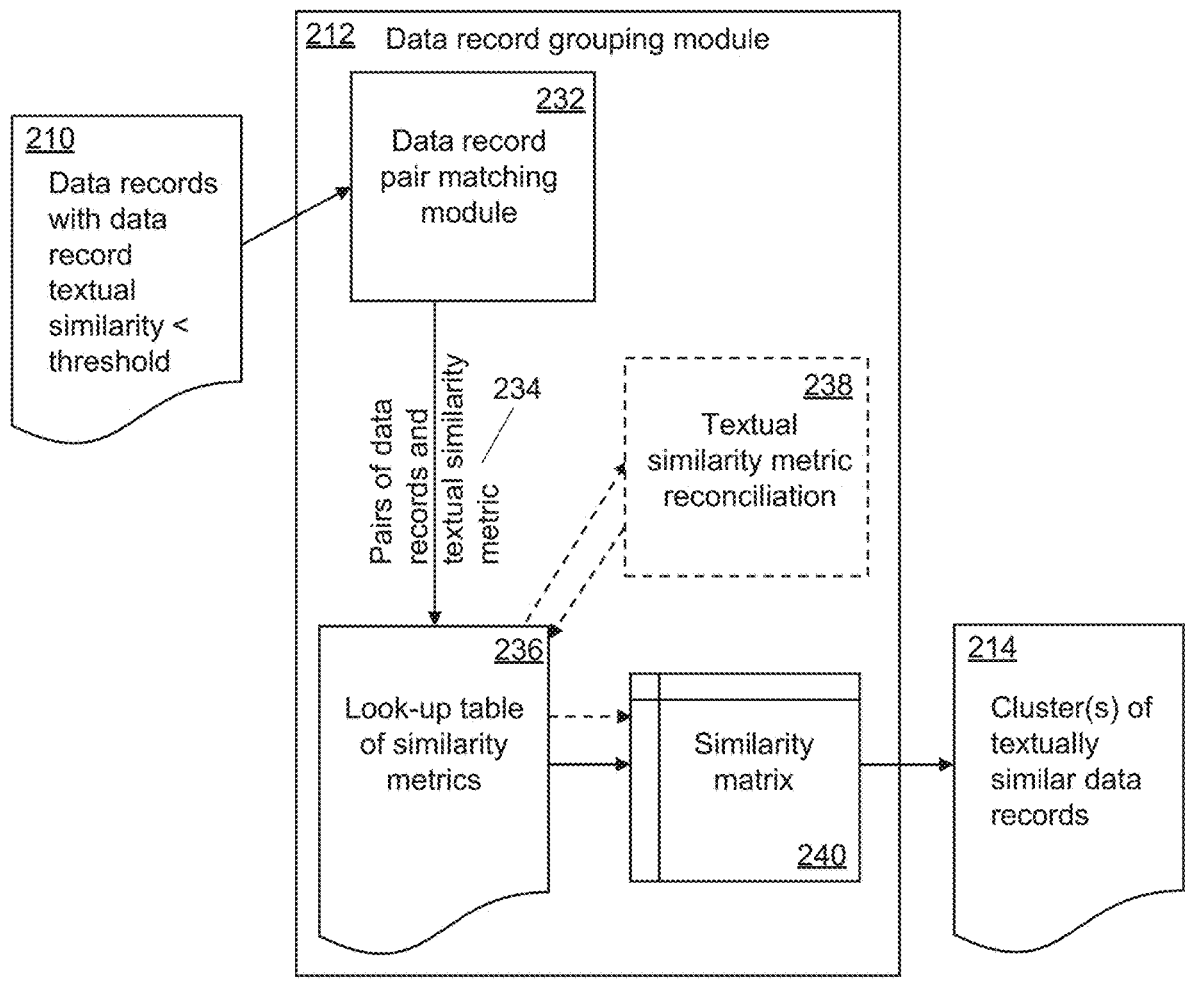
FIG. 5 shows a system implementing a similarity matrix according to an embodiment of the invention.

FIG. 5 shows a system implementing a similarity matrix according to an embodiment of the invention. Data records having a similarity below a predetermined similarity threshold are provided as input to a data record pair matching module 232 of the data record grouping module 212.

The data record grouping module 212 may detect similarities between different descriptions between data records, by pairing up the data records, and calculating the similarity between each pair of textual descriptions 234 of the paired data records. For example, descriptions like "office supplies", "office stationary", and "telephone bill" would be paired as (["office supplies", "office stationary"], ["office supplies", "telephone bill"], and ["office stationary", "telephone bill"]). Pairing in this way provides a complexity of "O(n!/(n−k)!k!)"; which means if there are three data records, there are three resulting pairs. If there are 100 data records, there are 4950 resulting pairs. In one test example, an average number of transactions in the sample used to build the algorithm for the system was 5000 transactions which resulted in approximately 12.5 million pairs.

A similarity metric is then identified by the data record grouping module 212 for each pair of data records 234 to determine a level of similarity of the descriptions of each pair. For example, an edit distance may be used (an edit distance is a way of quantifying how dissimilar two strings (textual descriptors) are from one another by counting the minimum number of operations required to transform one string into the other). An example of edit distance which may be used is the Damerau-Levenshtein distance (a type of edit distance which allows for transpositions, insertions, deletions and substitutions). Another example of a similarity metric is the cosine distance based on word count, and another example is the cosine distance based on "word2vec" to calculate how descriptions in each pair match. The cosine distance, or cosine similarity, is a measure of is similarity determined as a Cosine of an angle between two non-zero vectors, resulting in a value between 0 and 1 and indicating a level of clustering. Cosine similarity may advantageously consider a semantic of input strings, rather than just characters within the strings. "Word2vec" is a group of related models that can take a large body of text as input and produce a vector space, with each word assigned to a vector in the space. In some examples two or more such similarity metrics may be calculated for each pair. Each metric produces a value that determines how similar are the two descriptions in one pair. For example, a cosine similarity between ["office supplies", "office stationary"] is 50% because one of two words ("office") of each textual description match exactly, and the other word ("supplies", "stationary") does not match at all. Each of the metrics captures a specific type of similarity.

In other words, the data record pair matching module is arranged to identify the textual similarity metric of the data records of each pair of data records by applying one or more similarity metric methods to each pair of data records to obtain a textual similarity metric for each pair. The one or more similarity metric methods comprising one or more of: an edit distance for each pair of data records; a cosine distance based on a word count of the data records; and a cosine distance based on a word2vec analysis of the data records.

In some examples, the different metrics used may be reconciled using weights, for example weightings calculated using Convex Optimisation. This step may be performed by a textual similarity metric reconciliation module 238. Thus in examples where a reconciled similarity metric is determined for each pair of data records 234, the data record pair matching module 232 is arranged to identify the textual similarity metric of the data records 210 of each pair of data records 234 by, following obtaining the textual similarity metric for each pair, reconciling the textual similarity metrics 238 for the pairs of data records 234 in the group of data records.

The data record pairs 234 and the calculated similarity metrics (or reconciled similarity metrics if these are calculated) are stored in a lookup table 236 so the data records can be clustered. In other words, the data record pair matching module 232 is arranged to: identify pairs of data records 234 from the group of data records 210; identify a textual similarity metric of the data records of each pair of data records 234; and record the identified textual similarity metrics of each pair of data records in a lookup table 236.

Following determination and recordal of the similarity metrics, the data record pair matching module 232 is arranged to record a similarity matrix 240 from the identified textual similarity metrics of each pair of data records 234 recorded in the lookup table 236, the similarity matrix 240 comprising the pairs of data records with their corresponding textual similarity metrics. In examples where a reconciled similarity metric is determined for each pair of data records, the data record pair matching module 232 is arranged to provide a similarity matrix comprising the reconciled textual similarity metric of the data records of each pair of data records. For example, for a financial transaction set of data records, for every customer, all transactions are recorded as columns headers and row names where the similarity metric is placed in cells at the intersections between different descriptions. Clusters of textually similar data records 214 are output from the data record grouping module 212.

Data Clustering

Figure 6:
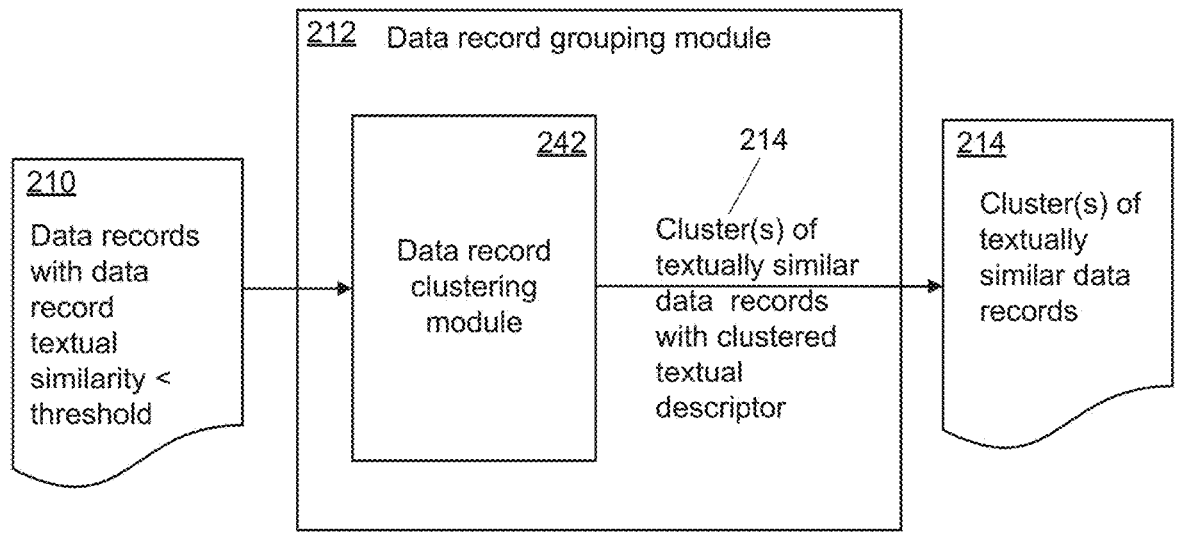
FIG. 6 shows a portion of a system comprising a data record clustering module according to an embodiment of the invention.

Clusters of textually similar data records 214 may be stored in the textually matched data record log 216 with the data records having a textual similarity above a threshold 208 from the data record textual match analysis module 206. FIG. 6 shows a portion of a system comprising a data record clustering module 242 according to an embodiment of the invention. The data clusters 214 may be determined by a data record clustering module 242 of the data record grouping module 212 and may be recorded with a determined cluster description which fits all the data records in that cluster. For example, if the individual data records in a cluster have textual descriptors "rent", "rental payments", "business rental" and "business premises rental", a clustered textual descriptor may be "business rent" as this applies to all the data records in the cluster.

In some examples, an "Ordering Points To Identify The Clustering Structure (OPTICS)" method may be used by the data record clustering module 242 to cluster descriptions into groups. All descriptions are selected that are close to each other based on the similarity measure determined and logged in the lookup table 236. In other words, the data record grouping module 212 may comprise a computer-implemented data record clustering module 242 arranged to: cluster the textual portions of the data records 210 to identify a clustered textual descriptor for the textually matched data records in the group; and provide the textually matched data records in the group 214, with their corresponding clustered textual descriptor, to the computerised log of textually-matched data records 216.

Timestamp Analysis

Figure 7:
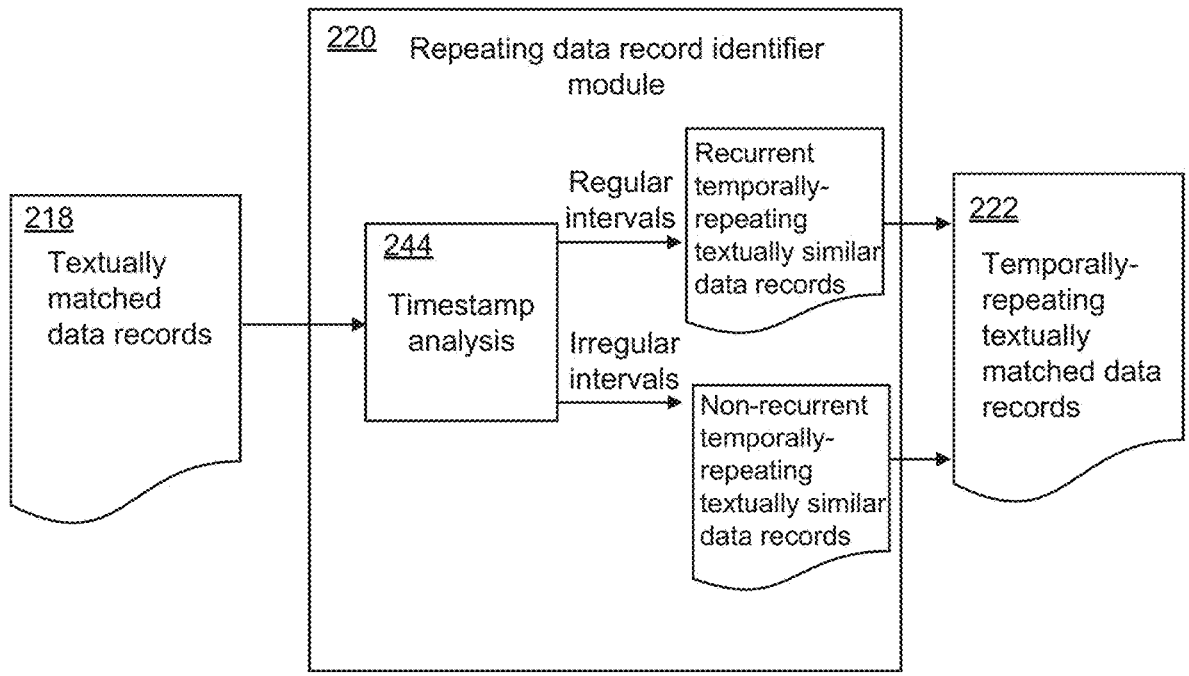
FIG. 7 shows a portion of a system comprising a timestamp analysis module according to an embodiment of the invention.

Following the provision of textually matched data records 218 from the text matching computer module 104, the system 100 comprises a repeating data record identifier module 218. As shown in FIG. 7, this module 218 may comprise a timestamp analysis module 244 according to an embodiment of the invention. By analysing the timestamps of each data record, it may be determined if the records in a group are recurrent (i.e. regularly, or periodically repeating). To identify whether a group of data records are recurrent or not, time deltas between data record timestamps may be determined (i.e. the difference in time between two consecutive timestamps), and the data records may then be categorised as, for example, daily, weekly, monthly, quarterly, bimonthly and annually recurrent. Determination of whether a group of data records are recurrent may be whether there is a "mode" of time deltas that relates to the number of data records. If a group doesn't include regularly recurrent data records, those data records may be classified as a repeated data records (i.e. they occur more than once, but are not regular in time). The recurrent and repeating data records may then be output as temporally repeating, textually matched data records 222. A record of whether a data record is recurrent or repeated may be logged.

In other words, the repeating data record identifier module 220 may be arranged to identify temporally-repeating data records 222 of the textually matched data records 218 by: analysing the timestamp portions 244 of the textually matched data records 218 to determine a time separation between pairs of the textually matched data records which are temporally consecutive; determining if the textually matched data records comprise timestamp portions separated by regular time intervals; if the textually matched data records comprise timestamp portions separated by regular time intervals, categorising the textually matched data records as recurrent temporally-repeating textually matched data records; and if the textually matched data records do not comprise timestamp portions separated by regular time intervals, categorising the textually matched data records as non-recurrent temporally-repeating textually matched data records.

Amount Identification and Similarity

Figure 8:
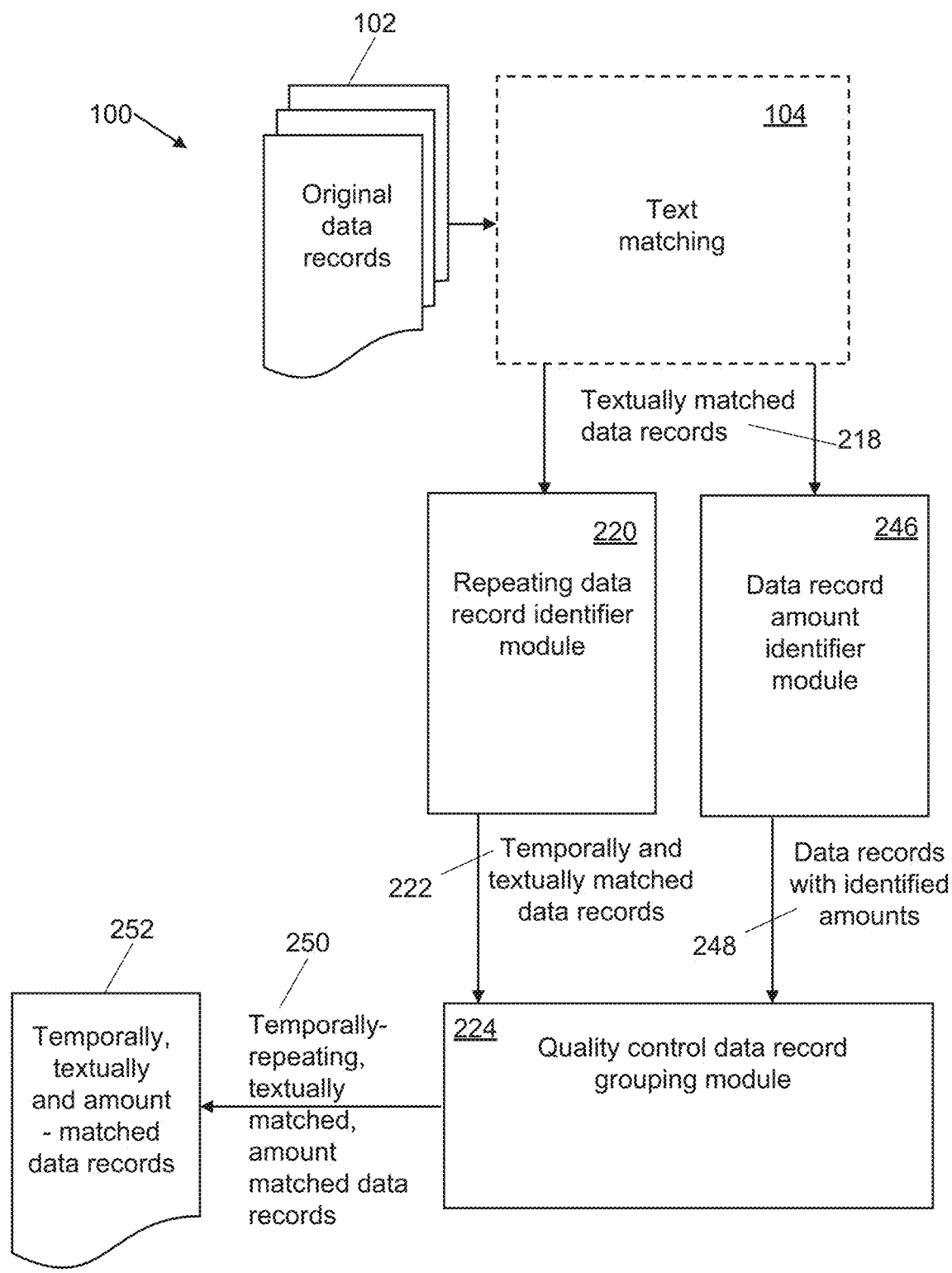
FIG. 8 shows a system comprising a data record amount identifier module according to an embodiment of the invention.

FIG. 8 shows a system 100 comprising a data record amount identifier module 246 according to an embodiment of the invention. In examples where each of the original data records further comprises an amount portion (e.g. a financial amount in GB Sterling or US Dollars, a computer memory amount in MB or kB, a version number of a file (i.e. indicating the amount of updates created or a file), or a weight in kg, for example), the data record amount identifier module 246 may be arranged to identify an amount value of each data record in the group of textually matched data records 246 from the amount portions of the data records. The module 246 therefore outputs a group of data records having identified amounts 248.

In FIG. 8 the identification of an amount for each data file is shown taking place alongside identification of any temporal recurrence of the data records by the repeating data record identifier module 220. In other examples, identification of the amount value of a data record may take place before or after identification of any temporal recurrence of the data records in the group, or before any textual similarity determination in some examples. The grouped (textually, temporally and in some examples based on amount) data records are provided to a quality control data record grouping module 224.

Amount Similarity Metric

Figure 9:
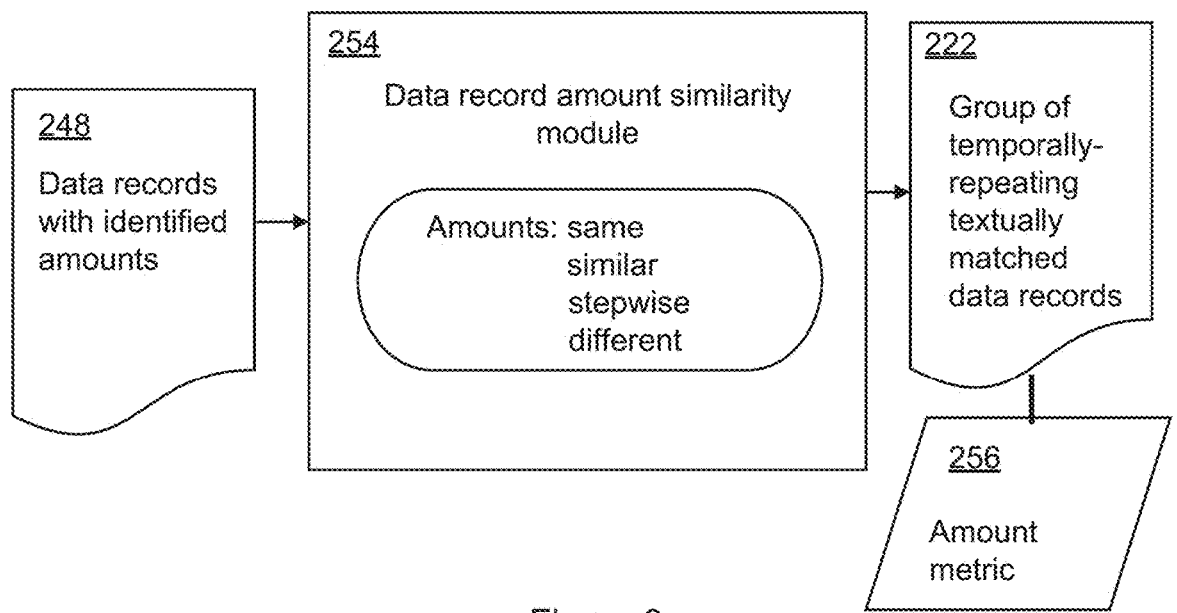
FIG. 9 shows a portion of a system comprising a data record amount similarity module according to an embodiment of the invention.

FIG. 9 shows a portion of a system 100 comprising a data record amount similarity module 254 according to an embodiment of the invention. In some examples this module 254 may be a part of the quality control data record grouping module 224. The data records with amounts identified 248 (which may be temporally repeating and/or textually matched) are provided to the data record amount similarity module 254 to determine a similarity of the amounts of the data records in the group.

In some examples the data record amount similarity module 254 may be arranged to analyse the temporally-repeating textually matched data records 248 in the group for amount value similarity, and if all the data records in the group of temporally-repeating textually matched data records 248 have a level of temporal, textual and amount value similarity above an overall similarity threshold, provide the temporally-repeating, textually matched, similar amount value data records to a computerised log of temporally, textually, and amount-matched data records 222. Thus if a series of data records indicate a similar textual descriptor and a similar amount, these data records may be identified as relating to a similar occurring data record and may be used, for example, to predict a likely future data record. An example is of a bill which is paid monthly for a similar amount each month. A future bill may be predicted from historical data records and used in budgeting for outgoings.

Another example is of a particular stock item (e.g. powder chemical) which is shipped from a warehouse of a manufacturing plant. A future likely shipment may be predicted, and the amount required predicted, to aid future chemical manufacturing to have the required amount in stock.

As another example, an amount metric 256 may be determined to classify the amount value of each data record in a group to be exact, similar (e.g. the same to within ±5%), stepwise (e.g. increasing by a set amount with time, within a predetermined tolerance), or different (e.g. no clear pattern). Such amount metric 256 determination may be used for future amount forecasting of expected future data records, for example in cash flow forecasting. In some examples, for different amount forecasting, if the number of data records in a group is greater than e.g. 20, a time series model may be is used to forecast the subsequent amount. Examples of possible models include: Long short-term memory (LSTM), which is an artificial neural network-based model; Autoregressive Integrated Moving Average (ARIMA); Generalized Autoregressive Conditional Heteroskedasticity (GARCH); and Vector Error Correction Model (VECM). Other models may be suitable for use. Such models may be fitted to forecast, for example, an upcoming amount for a future expected data record. A single model, or multiple models, could be used for the same series of data records. The choice of model(s) may be based on statistical characteristics of the time-series in order to provide a high accuracy. For example, an ARIMA model may be fitted to forecast an upcoming amount for a future expected data record. ARIMA is a class of models which can capture a suite of different standard temporal structures in time series data.

Thus in other words, the system 100 may comprise a data record amount similarity module 254 arranged to determine a degree of similarity of the identified amount values of the textually matched data records in the group 248, 222; and assign an amount metric 256 to the group based on the determined degree of similarity.

Group Descriptor

Figure 10:
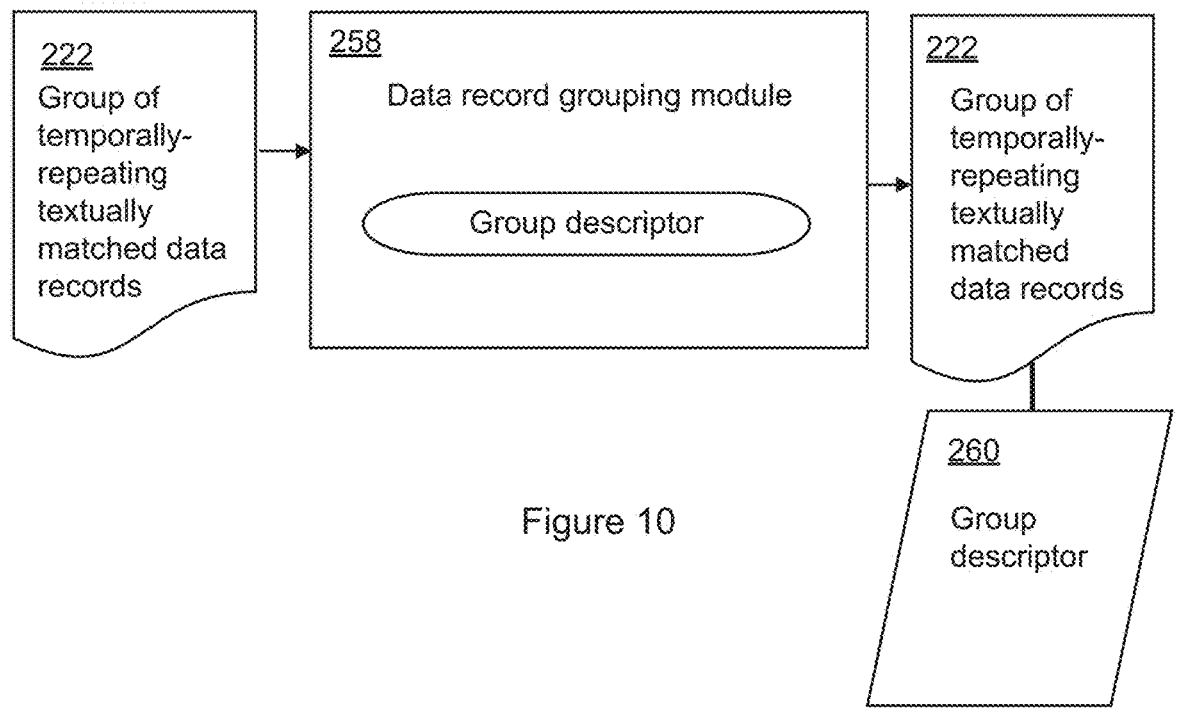
FIG. 10 shows a portion of a system comprising a data record grouping module according to an embodiment of the invention.

FIG. 10 shows a portion of a system comprising a data record grouping module 258 according to an embodiment of the invention. The group of temporally repeating, textually matched data records 222 is provided to a data record grouping module 258. This module 258 is arranged to summarise the descriptions/text descriptors of all data records included in the group despite the variation in their text, to determine a group descriptor 260, and apply the group descriptor 260 to the data record group 222. The group descriptor 260 is a general descriptor for the group of data records applicable to all records in the group 222.

Quality Control

Figure 11:
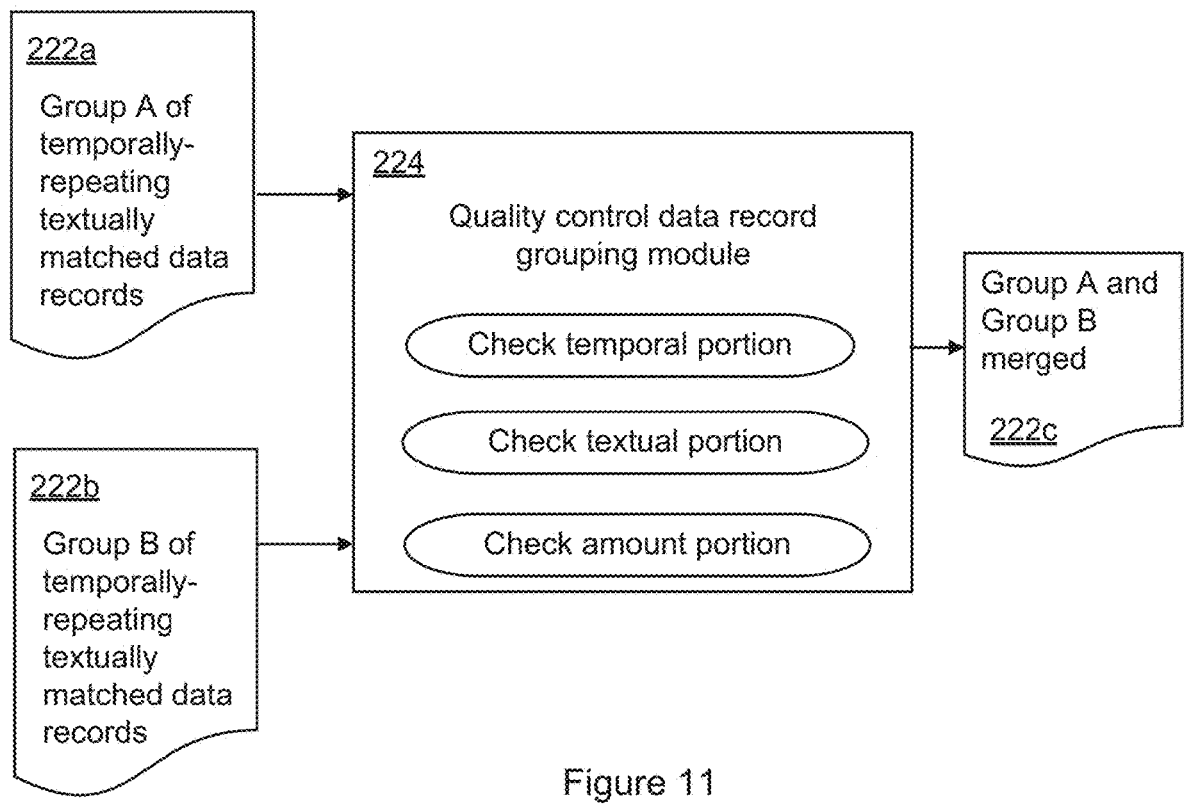
FIG. 11 shows a portion of a system configured to link data records from different groups according to an embodiment of the invention.

One solution is to use a quality framework such as that implemented by the quality control data record grouping module 224, where the output groups 222a, 222b (comprising a common or group descriptor, expected amount, and frequency) are evaluated for similarities. FIG. 11 shows a portion of a system 100 configured to link data records from different groups 222a, 222b according to an embodiment of the invention. Different groups 222a, 222b are assessed by the quality control module 224 by how similar they are (i.e. at group level instead on an individual data record level). The temporal, textual (and if applicable, amount) portion of the data at a group level for different groups 222a, 222b is assessed. If the two groups are identified as having a group similarity above a predetermined group similarity threshold, the two groups may be linked together or merged as a consolidated new group 222c.

Some implementations of the systems described herein may be considered as supervised learning approaches to data management, for which there may be no or limited accurate framework of assessing the quality of the machine learning. Thus in some examples, the clustering of data records may result in the separation of two related groups. This may be because each group contains homogeneous data records which are separated out during processing. This issue can deteriorate the quality of the overall solution and reduce the efficiencies obtained by grouping related data records as described.

For example, similarities may be assessed between the groups using a cosine similarity, word2vec, and/or edit distance approach as described above. If two or more groups 222a, 222b are determined as highly similar (e.g. having a similarity above a threshold of 0.86), they may be merged together as a single group 222c in a post processing step.

In other words, the quality control data record grouping module 224 of the system 100 may be is arranged to compare one or more of the textual portions, temporal portions, and in some examples amount portions, of the data records in the group 222a with further textual portions, further temporal portions, and in some examples further amount portions of further data records in a further group 222b. If the textual, temporal (and amount) portions of the data records in the group 222a are determined to match the further textual, temporal (and amount) portions of the further data records of the further group 222b above an inter-group matching threshold, the module 224 may link the group 222a and further group 222b together as associated groups.

Data Pre-Processing

Figure 12:
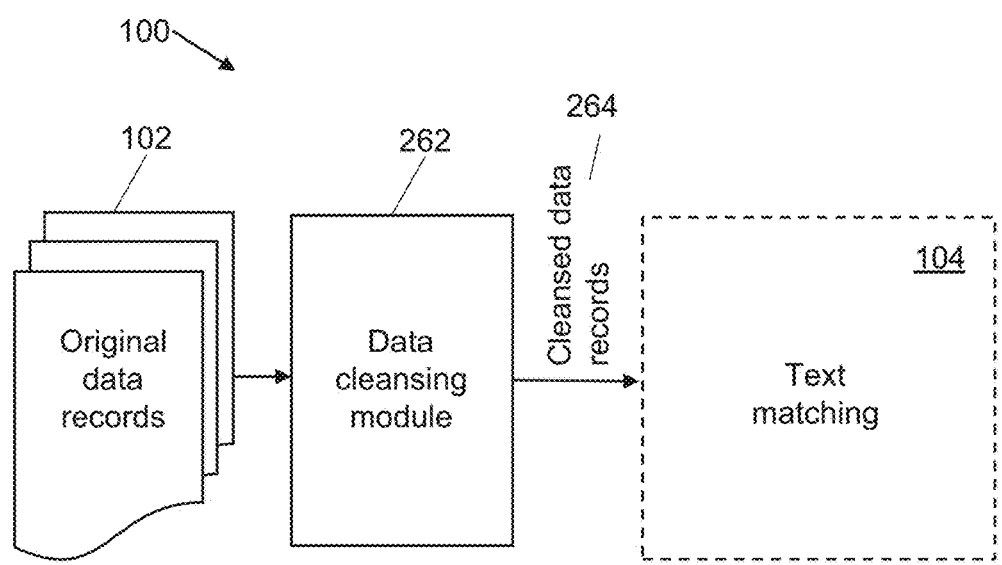
FIG. 12 shows a portion of a system comprising a data cleansing module according to an embodiment of the invention.

FIG. 12 shows a portion of a system 100 comprising a data cleansing module 262 according to an embodiment of the invention. In some examples the original data records 102 may be processed by a data cleansing module 262 arranged to reformat the original data records 102 prior to processing by the data record textual match analysis module 206 of the textual grouping module 104 to provide the original data records having a common format, as cleansed data records 264. Data cleansing may help to ensure that the data records match the required format needed by modules (and the algorithms run by the modules) in the subsequent steps. In some examples, most of the pre-processing may be implemented for data textual descriptors, as these fields may take any format such as text, digits, dates, control characters, etc.

Examples of pre-processing/data cleansing comprise year filtering to select the data needed to identify patterns for a particular year (e.g. to reduce the total number of data records processed); removing stop words that don't affect the meaning of the textual description; replacing a textual value for month with the word "month" (for example "July" is replaced with "month"); and removing digits and special and control characters.

Example—Cash Flow

Figure 13:
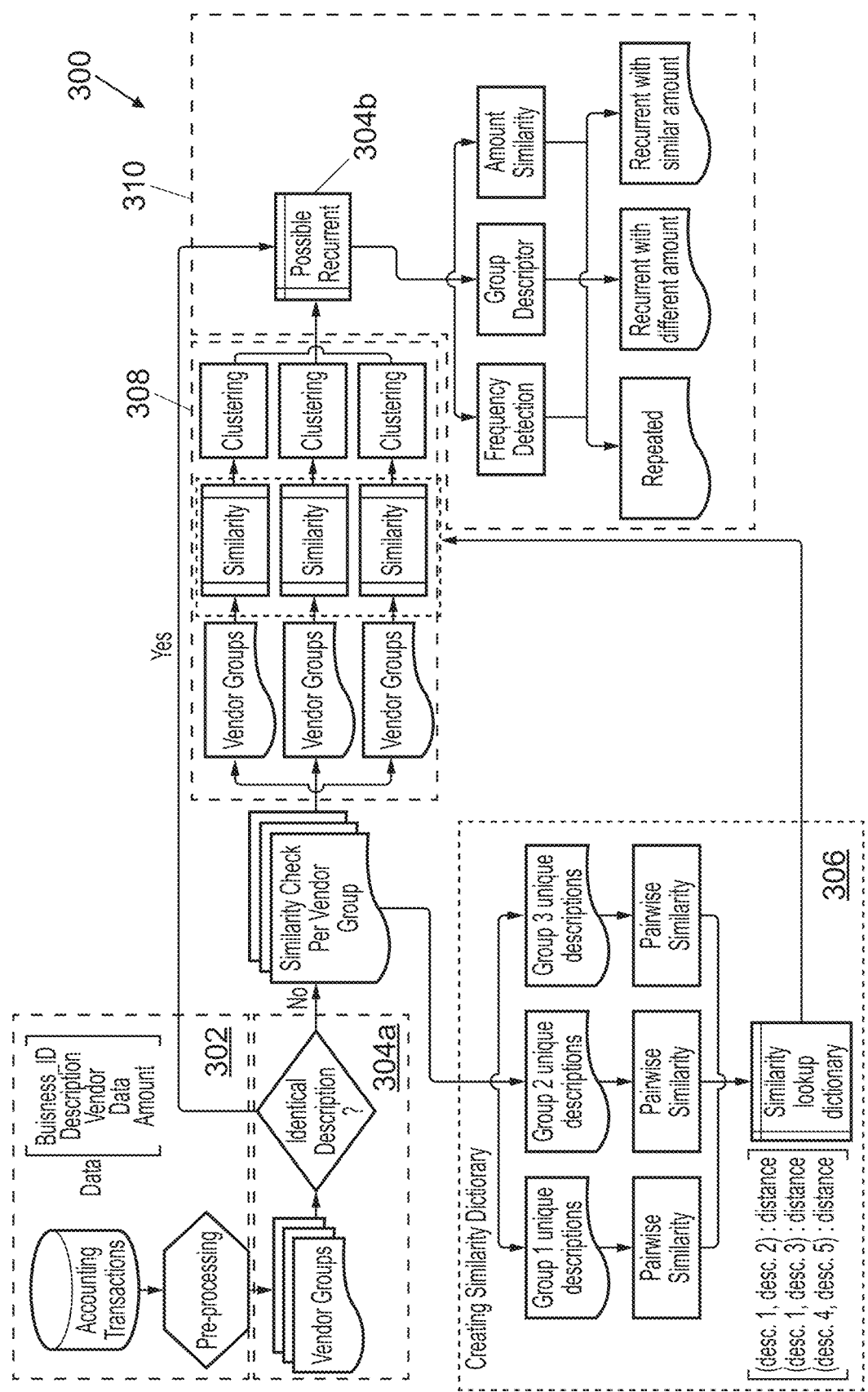
FIG. 13 shows an exemplary system according to an embodiment of the invention.

FIG. 13 shows an exemplary system 300 according to an embodiment of the invention. It will be appreciated that other examples are not limited to accounting transactions, and non-financial examples also fall within the scope of the claims.

This system is an example relating to cash flow modelling. Portion 302 pre-processes the accounting transaction data to cleanse the data as in FIG. 12. The data records shown include data fields such as a business ID, description of transaction, vendor name, date of transaction (the time stamp) and an amount (a financial amount for the transaction). In other examples one or more such fields may be absent, and other data fields may be present.

Portions 304a and 304b identify a natural similarity in description/textual descriptor of the transactions. In portion 304a a check is made for identical descriptions between transactions. The textual descriptor may be the vendor field, customer field, and/or description field, for example (as in module 206 of FIG. 3). If a match is identified the transactions are classified as "possible recurrent" and recorded in a computer log 304b. If a match is not identified at first, but there may be a relationship between transactions, the transactions are processed in portions 306 and 308.

Portion 306 performs a similarity check, in this example per vendor group (i.e. the data is grouped by vendor and checks are made within each group of data transactions. for a particular vendor). Portion 306 performs a pairwise similarity check as in module 212 of FIG. 3. From a similarity lookup table/dictionary formed following the pairwise similarity analysis, the data is provided for creation of a similarity matrix and data clustering in portion 308, as in module 212 of FIGS. 3 and 6 and module 242 of FIG. 6.

The data matched from portions 304a and 306 provided to the "possible recurrent" log 304b via the clustering step 308 is then passed to portion 310 for identification of recurrent and repeating transactions, as in module 220 of FIGS. 3 and 7. The resultant grouping of transactions, as "repeated", "recurrent with a different amount", and "recurrent with a similar amount", can then be used as a summary of the original transactional data and may be used for future likely transaction prediction, as in module 228 of FIG. 4.

FIG. 14 shows an example of grouped data records 450 identified from original data records 400 according to an embodiment of the invention. Original data records 402 and 412 relating to rent are grouped by the system 100 as quarterly-recurrent output data record 452, because they have related descriptions "headquarter rent" and "rent", and the same amount "£2500". Original data records 404 and 414 relating to wages are grouped by the system 100 as monthly-recurrent output data record 454, because they have related descriptions "wages" and "salaries" and identical "customer" textual descriptions "John Jones", and the similar amounts "£3530.33" and "£3500.33". Original data records 406, 408 and 410 relating to office supplies are grouped by the system as non-regular repeating output data record 456, because they have related descriptions "business cards" twice and "business transportation", related "customer" textual descriptions "Identify Links" twice and "East Ink", with dis-similar amounts. For each output data record an expected day/week of future transaction of that type is predicted, which along with the expected amount field, may be used to help cash flow predictions.

In a real-world system there may be may thousands of original data records 400 per month. Storing the smaller number of resultant output data records 450 requires a smaller amount of computer memory than storing the original data records, and processing the smaller number of resultant output data records requires less processing time and power than processing the original data records. Processing the resultant output data records, for example to search for a particular type of transaction or likely payment date, therefore requires less memory and processing burden than the original records and thus provides a technical advantage. The resultant output data records also allow for accurate predictions to be made of future data records. In a real-world simulation, reducing the number of transactions fed into similarity calculations performed by the system represented in FIG. 13 reduced the processing time for 10000 original transactions from 20 minutes to 45 seconds.

Figure 15:
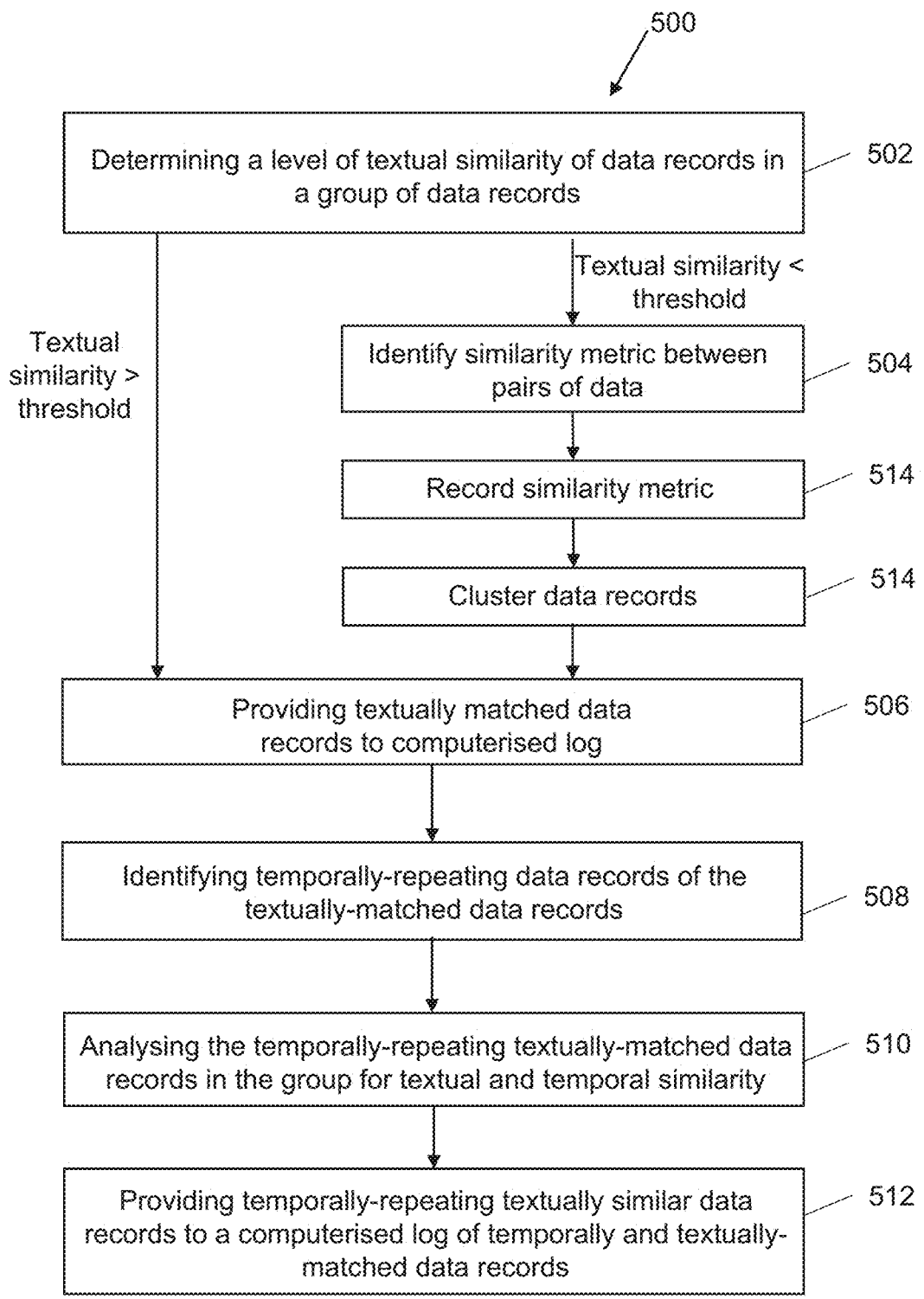
FIG. 15 shows a method according to an embodiment of the invention.

FIG. 15 shows a method 500 according to an embodiment of the invention. The method may be performed by one or more electronic processing devices. The method may be represented by computer-executable instructions stored in a computer readable medium. The computer-executable instructions may be executed, such as by the computer 1000, to implement a method according to an embodiment of the invention such as illustrated in FIG. 15.

The method 500 comprises: determining a level of textual similarity of data records in a group of data records 502; if the data records in the group of data records have a level of textual similarity above a textual similarity threshold, providing the data records to a computerised log of textually-matched data records 510; and if the data records in the group of data records have a level of textual similarity below the textual similarity threshold, providing the data records for further similarity analysis, the further similarity analysis comprising: identifying a textual similarity metric between pairs of data records in the group of data records 504; recording the textual similarity metric of the group of data records 506; clustering the data records of the group of data records using the recorded textual similarity metric to form one or more groups of textually similar data records 508; and providing the one or more groups of textually similar data records to the computerised log of textually-matched data records 510; identifying temporally-repeating data records of the textually-matched data records recorded in the computerised log of textually-matched data records 512; and analysing the temporally-repeating textually-matched data records in the group for textual and temporal similarity 514, and if all the data records in the group of temporally-repeating textually similar data records have a level of temporal and textual similarity above an overall similarity threshold, providing the temporally-repeating textually similar data records to a computerised log of temporally and textually-matched data records 516.

Adding New Data Records to a Group

Once a data record group 222 of temporally-repeating textually similar data records is created as described above, it is recorded to a computerised log. The abovementioned methods of FIG. 1-15 may be used to group data which has not been classified or categorised into group (i.e. has not been processed to determine any temporal repeating patterns or textual similarity with other data records prior to grouping). These methods may be generally considered to be unsupervised machine learning methods.

If a new data record is recorded/created after forming the group, this data record may also fit in the group, i.e. it may be textually similar to the other data records in the group, and may temporally-repeat in the same way (e.g. monthly). One way to capture this new data record in the existing group is to re-run the above described method again for the full data set (the data records in the group and the new data record) to capture the new group of data records, including the new record.

However, other approaches may also be taken which are faster, require less computational/processing power, and are a more efficient use of computational memory than re-running the whole data set again. Such methods may generally be referred to as supervised machine learning methods. Thus, after the initial classification of data records using unsupervised machine learning, new data records may be classified to either join existing data records which have been grouped, or to form a new group. The data group output from the unsupervised machine learning model(s) may be used to train a further machine learning model (e.g. a deep learning model) to comprehend the relationship between new data record fields (amount, descriptions, dates, . . . etc.) and the data recorded in the earlier formed group 222.

Once the relationship between new data records and data recorded in the group 222 is established (i.e. the machine learning model has been the trained), the trained model may be used to auto-classify new data records into existing/new groups. This reduces the processing time and computer power compared with simply "re-running" the unsupervised model.

Figure 16:
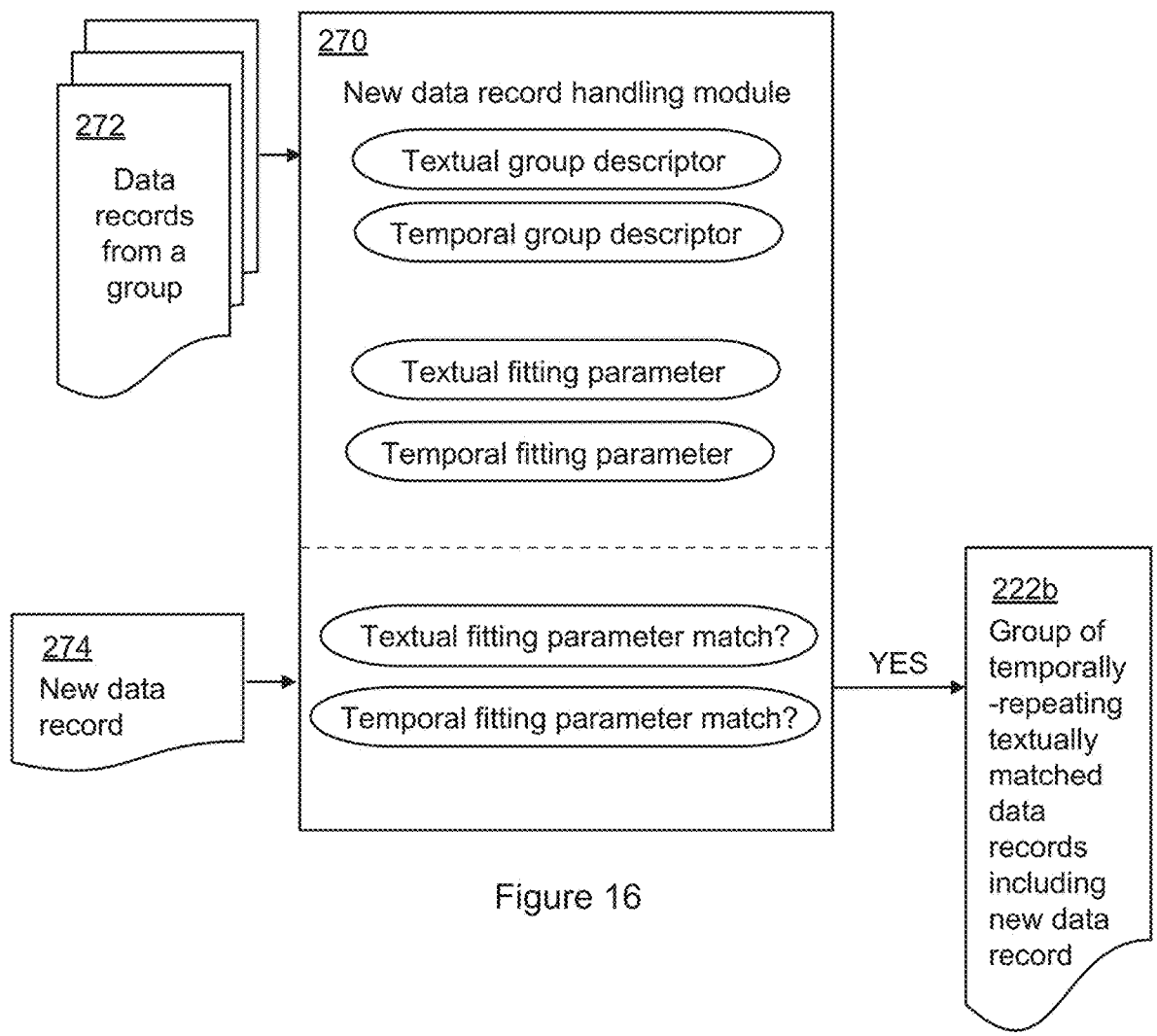
FIG. 16 shows an example method of adding new data records to a group according to an embodiment of the invention.

FIG. 16 shows an example of adding new data records to a group according to an embodiment of the invention. A recorded group contains a plurality of data records 272 which exhibit textually similar descriptions, have a temporally repeating nature (e.g. a frequency of data record repeat), and in some examples share a similar amount value. A method to determine whether to include a new data record 274 into an existing group as illustrated comprises: assigning a textual group descriptor and a temporal group descriptor to all data records 272 in a group; the textual group descriptor based on the textual similarity of data records 272 in the group and the temporal group descriptor based on the temporal repetition of the data records 272 in the group; determining a textual fitting parameter based on the textual group descriptor and determining a temporal fitting parameter based on the temporal group descriptor, for the data records 272 in the group; determining if a textual portion of a new data record 274 corresponds to the textual fitting parameter; and determining if a timestamp portion of the new data record 274 corresponds to the temporal fitting parameter; and if the textual portion corresponds to the textual fitting parameter and if the timestamp portion corresponds to the temporal fitting parameter, assigning the new data record to the group 222b. Such a method may be performed by a new data records handling module 270, for example.

In some examples, more than one data group 222 may be merged (e.g. into one dataframe) to form a merged data group, and the data records in the merged data group are those which are assigned textual and temporal group descriptors.

In some examples, the method to determine whether to include the new data record 274 into an existing group comprises assigning an amount group descriptor to all data records in a group; the amount group descriptor based on the amount value of data records in the group; determining an amount fitting parameter based on the amount group descriptor; determining if an amount portion of the new data record 274 corresponds to the amount fitting parameter; and if the amount portion corresponds to the amount fitting parameter, assigning the new data record 274 to the group 222b.

The new and/or grouped data records may be pre-processed to convert textual fields to numerical values, for example using a natural language understanding method, such as Word2Vec, a Bidirectional Encoder Representations from Transformers (BERT), other Transformer, or other suitable method. Thus a textual group descriptor may be converted to a numerical representation for processing. BERT is a language representation model which provides for pretraining of deep bidirectional representations from unlabelled text by jointly conditioning on both left and right context in all layers. A Transformer is a language representation model that uses self-attention mechanism to solve sequence-to-sequence tasks. These natural language understanding methods may be used in Natural Language Processing (NLP) of textual files such as data record descriptions.

Determining a fitting parameter (e.g. for textual and/or temporal group descriptors) may be performed using a Gradient Boosting Machine (GBM), deep neural network, and/or other classification algorithm (i.e. as a type of discrete value) to extract suitable fitting parameters.

Determining a fitting parameter (e.g. for an amount group descriptor) may be performed using an advanced time series analysis model such as Threshold Autoregressive (TAR), Momentum Threshold Autoregressive (M-TAR) or another advanced time series algorithm, for example, to forecast the amount group description (i.e. as a type of continuous time series, a value which may take any value among a continuum of possible values) and extract fitting parameters for the group amount.

An advanced time series analysis models may be used to forecast a continuous time series (i.e. a numerical amount which takes a value from a continuum/continuous series of possible values). Such models may use a preliminary analysis in order to accurately estimate and forecast the continuous series. For example, amount values may represent a seasonal and/or temporally varying trending pattern. Consequently, a timeseries decomposition may be required as a preliminary step to select and fit the statistical model to the amount values. This may include decomposing the time series into trend, cyclical, seasonal and irregular components. In order to fit the models, mandatory parameters may be estimated. For example, the number of the number of the autoregressive lags (p), the degree of differencing (d) and the number of moving average lags (q). p, d, q may be determined by an information criterion (e.g. Akaike Information Criterion (AIC), Bayesian Information Criterion (BIC)). The choice of the information criterion may be determined at the model selection stage.

In some examples, classifying (grouping) a new data record 274 may be performed in a sub-second in runtime, even if many hundred or thousand data records are already classified into one or more groups 222.

Figure 17:
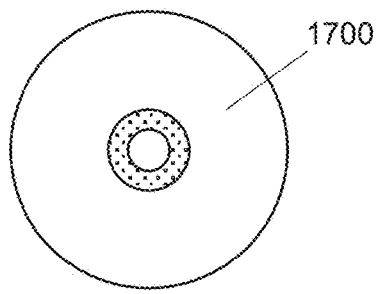
FIG. 17 shows a non-transitory computer-readable medium according to an embodiment of the invention.

FIG. 17 shows a non-transitory computer-readable medium 1700 according to an embodiment of the invention. Computer program code may be stored on such a medium 1700 and, when executed by a computer/processor, perform any method claimed herein Reconciling the similarity metric for data records as a single similarity metric that captures different aspects of similarity (e.g. syntax, semantics, and number of shared words) as described in relation to FIG. 5 allows for improved matching based on textual descriptions for more accurate groupings. Following from this, obtaining a group descriptor applicable to all data records in a group, as in FIG. 10, usefully summarises different descriptions as a single meaningful textual description. Overall, examples described herein may allow for a capability to query, manage and forecast customers transaction or other bodies of data records. Such examples improve smart engines used to query the history of transactions and data records.

Further, examples may be considered to perform unsupervised machine learning, which can suffer from the unavailability of quality metrics in learning which transactions may be logically grouped together. The quality measuring framework as described in relation to FIG. 11 serves to improve the resultant data groupings provided by machine learning system, thereby providing a technical solution to the problem of a machine learning computer system aiming to accurately and comprehensively group related but non-identical data records.

Potential applications of systems described here include classifying customers transactions, for example to support queries like "how much did I spend on a certain types of transactions from a specific vendor in a specific period", whether the query is submitted using an accounting software, chatbot or voice commands. Examples may also allow for cash flow forecasting where recurrent transactions are expected to produce the same/similar cash inflow/outflow in the future. Intelligent reporting may be performed based on identifying repeated and recurrent transactions.

Another potential application is to reduce transaction entry by displaying the most probable repeated/recurrent transaction that will appear on the day, thereby reducing the amount of data entry required and consequently reducing processor burden and memory requirements. Bank feeds may also be used as a set of data records in systems described herein.

Many alerts may be developed based on the resulting grouped data records produced by systems described here, such as alerting customers to a missed transaction entry if it is recurrent, and alerting customers when the amount entered deviates from the history of transactions as in the example of bank feeds.

Whilst embodiments may be described with reference to data objects representing financial transactions, it will be understood that these are merely examples and that embodiments are not limited in this way. Embodiments are not limited to transaction data records and other fields may be used or added.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A system for grouping data records for subsequent data record searching, the system comprising:
   a computer-implemented data record textual match analysis module arranged to:
      determine a level of textual similarity of data records in a group of data records; and
      if the data records in the group of data records have a level of textual similarity above a textual similarity threshold, provide the data records to a computerised log of textually-matched data records; and
      if the data records in the group of data records have a level of textual similarity below the textual similarity threshold, provide the data records to a computer-implemented data record grouping module for further similarity analysis;
   a computer-implemented data record grouping module arranged to perform the further similarity analysis by being arranged to:
      identify a textual similarity metric between pairs of data records in the group of data records;
      record the textual similarity metric of the group of data records;
      cluster the data records of the group of data records using the recorded textual similarity metric to form one or more clusters of textually similar data records; and
      provide the one or more clusters of textually similar data records to the computerised log of textually-matched data records;
   a computer-implemented repeating data record identifier module arranged to identify temporally-repeating data records of the textually-matched data records recorded in the computerised log of textually-matched data records; and
   a computer implemented quality control data record grouping module arranged to:
      analyse the temporally-repeating textually-matched data records in the group for textual and temporal similarity, and
      if all the data records in a group of temporally-repeating textually similar data records have a level of temporal and textual similarity above an overall similarity threshold, provide the temporally-repeating textually similar data records to a computerised log of temporally and textually-matched data records,
   wherein the computer-implemented data record grouping module is arranged to assign a group descriptor to the group of temporally-repeating textually-matched records.

2. The system of claim 1, comprising a computer-implemented forecasting module configured to predict a future data record based on the temporally-repeating textually similar data records, the future data record comprising:
   a textual portion matching the textual portions of the temporally and textually-matched data records; and
   a timestamp corresponding to a time predicted based on the timestamps of the temporally and textually-matched data records.

3. The system of claim 1, wherein the data record grouping module comprises a computer-implemented data record pair matching module arranged to:
   identify pairs of data records from the group of data records;
   identify a textual similarity metric of the data records of each pair of data records;
   record the identified textual similarity metrics of each pair of data records in a lookup table; and
   record a similarity matrix from identified textual similarity metrics of each pair of data records recorded in the lookup table, the similarity matrix comprising the pairs of data records with their corresponding textual similarity metrics; and
   provide the similarity matrix for the clustering of the data records using the similarity matrix.

4. The system of claim 3, wherein the data record pair matching module is arranged to identify the textual similarity metric of the data records of each pair of data records by applying one or more similarity metric methods to each pair of data records to obtain a textual similarity metric for each pair, the one or more similarity metric methods comprising one or more of:
   an edit distance for each pair of data records;
   a cosine distance based on a word count of the data records; or
   a cosine distance based on a word2vec analysis of the data records.

5. The system of claim 4, wherein the data record pair matching module is further arranged to:
   identify the textual similarity metric of the data records of each pair of data records by, following obtaining the textual similarity metric for each pair, reconciling the textual similarity metrics for the pairs of data records in the group of data records using convex optimisation; and
   wherein the similarity matrix comprises the reconciled textual similarity metric of the data records of each pair of data records.

6. The system of claim 1, wherein the data record grouping module comprises a computer-implemented data record clustering module arranged to:
   cluster the textual portions of the data records to identify a clustered textual descriptor for the textually matched data records in the group; and
   provide the textually matched data records in the group, with their corresponding clustered textual descriptor, to the computerised log of textually-matched data records.

7. The system of claim 1, wherein the repeating data record identifier module is arranged to identify temporally-repeating data records of the textually matched data records by:
   analysing the timestamp portions of the textually matched data records to determine a time separation between pairs of the textually matched data records which are temporally consecutive;
   determining if the textually matched data records comprise timestamp portions separated by regular time intervals;
   if the textually matched data records comprise timestamp portions separated by regular time intervals, categorising the textually matched data records as recurrent temporally-repeating textually matched data records; and
   if the textually matched data records do not comprise timestamp portions separated by regular time intervals, categorising the textually matched data records as non-recurrent temporally-repeating textually matched data records.

8. The system of claim 1, wherein each of the original data records further comprises an amount portion, and wherein the system further comprises a data record amount identifier module arranged to:
   identify an amount value of each data record in the group of textually matched data records from the amount portions of the data records.

9. The system of claim 8, comprising a data record amount similarity module arranged to:
   determine a degree of similarity of the identified amount values of the textually matched data records in the group; and
   assign an amount metric to the group based on the determined degree of similarity.

10. The system of claim 8, wherein the quality control data record grouping module is further arranged to analyse the temporally-repeating textually matched data records in the group for amount value similarity, and
   if all the data records in the group of temporally-repeating textually matched data records have a level of temporal, textual and amount value similarity above an overall similarity threshold, provide the temporally-repeating textually matched amount value similar data records to a computerised log of temporally, textually, and amount-matched data records.

11. The system of claim 1, wherein the quality control data record grouping module is arranged to:
   compare one or more of the textual portions and temporal portions of the data records in the group with further textual portions and further temporal portions of further data records in a further group; and
   if the textual portions and temporal portions of the data records in the group are determined to match the further textual portions and further temporal portions of the further data records above an inter-group matching threshold, link the group and further group together as associated groups.

12. The system of claim 1, comprising a data cleansing module arranged to reformat the original data records prior to processing by the data record textual match analysis module to provide the original data records having a common format.

13. The system of claim 1, comprising a new data record handling module configured to:
   assign a textual group descriptor and a temporal group descriptor to data records in a group, the textual group descriptor based on the textual similarity of data records in the group and the temporal group descriptor based on the temporal repetition of the data records in the group;
   determining a textual fitting parameter based on the textual group descriptor and determining a temporal fitting parameter based on the temporal group descriptor, for the data records in the group;

determining if a textual portion of a new data record corresponds to the textual fitting parameter; and determining if a timestamp portion of the new data record corresponds to the temporal fitting parameter; and if the textual portion corresponds to the textual fitting parameter and if the timestamp portion corresponds to the temporal fitting parameter, assigning the new data record to the group.

14. A computer-implemented method of grouping data records for subsequent data record searching, the method comprising:

determining a level of textual similarity of data records in a group of data records;

if the data records in the group of data records have a level of textual similarity above a textual similarity threshold, providing the data records to a computerised log of textually-matched data records; and if the data records in the group of data records have a level of textual similarity below the textual similarity threshold, providing the data records for further similarity analysis, the further similarity analysis comprising:

identifying a textual similarity metric between pairs of data records in the group of data records;

recording the textual similarity metric of the group of data records;

clustering the data records of the group of data records using the recorded textual similarity metric to form one or more groups of textually similar data records; and providing the one or more groups of textually similar data records to the computerised log of textually-matched data records;

identifying temporally-repeating data records of the textually-matched data records recorded in the computerised log of textually-matched data records; and analysing the temporally-repeating textually-matched data records in the group for textual and temporal similarity, and if all the data records in a group of temporally-repeating textually similar data records have a level of temporal and textual similarity above an overall similarity threshold, providing the temporally-repeating textually similar data records to a computerised log of temporally and textually-matched data records; and assigning a group descriptor to the group of temporally-repeating textually matched data records.

15. At least one computer-readable medium having encoded thereon computer program code which, when executed by a computer, is arranged to perform:

determination of a level of textual similarity of data records in a group of data records;

if the data records in the group of data records have a level of textual similarity above a textual similarity threshold, provision of the data records to a computerised log of textually-matched data records; and if the data records in the group of data records have a level of textual similarity below the textual similarity threshold, provision of the data records for further similarity analysis, the further similarity analysis comprising:

identification of a textual similarity metric between pairs of data records in the group of data records;

recordal of the textual similarity metric of the group of data records;

clustering of the data records of the group of data records using the recorded textual similarity metric to form one or more groups of textually similar data records; and provision of the one or more groups of textually similar data records to the computerised log of textually-matched data records;

identification of temporally-repeating data records of the textually-matched data records recorded in the computerised log of textually-matched data records; and analysis of the temporally-repeating textually-matched data records in the group for textual and temporal similarity, and if all the data records in a group of temporally-repeating textually similar data records have a level of temporal and textual similarity above an overall similarity threshold, provision of the temporally-repeating textually similar data records to a computerised log of temporally and textually-matched data records; and assignment of a group descriptor to the group of temporally-repeating textually matched data records.

16. A system comprising:

a computer; and at least one computer-readable medium having encoded thereon computer program code which, when executed by the computer, causes the computer to carry out a method for grouping data records for subsequent data record searching, the method comprising:

determining a level of textual similarity of data records in a group of data records;

if the data records in the group of data records have a level of textual similarity above a textual similarity threshold, providing the data records to a computerised log of textually-matched data records; and if the data records in the group of data records have a level of textual similarity below the textual similarity threshold, providing the data records for further similarity analysis, the further similarity analysis comprising:

identifying a textual similarity metric between pairs of data records in the group of data records;

recording the textual similarity metric of the group of data records;

clustering the data records of the group of data records using the recorded textual similarity metric to form one or more groups of textually similar data records; and providing the one or more groups of textually similar data records to the computerised log of textually-matched data records;

identifying temporally-repeating data records of the textually-matched data records recorded in the computerised log of textually-matched data records;

analysing the temporally-repeating textually-matched data records in the group for textual and temporal similarity, and if all the data records in a group of temporally-repeating textually similar data records have a level of temporal and textual similarity above an overall similarity threshold, providing the temporally-repeating textually similar data records to a computerised log of temporally and textually-matched data records; and assigning a group descriptor to the group of temporally-repeating textually matched data records.

* * * * *